(12) United States Patent
Nishimori et al.

(10) Patent No.: US 10,961,412 B2
(45) Date of Patent: Mar. 30, 2021

(54) COATING COMPOSITION, COATING FILM, AND COATING METHOD

(71) Applicant: SHIKOKU RESEARCH INSTITUTE INCORPORATED, Kagawa (JP)

(72) Inventors: Shuji Nishimori, Kagawa (JP); Hideki Otori, Kagawa (JP); Hideki Matsuda, Kanagawa (JP); Masanori Akita, Hyogo (JP); Tsuyoshi Miyashita, Tochigi (JP)

(73) Assignee: SHIKOKU RESEARCH INSTITUTE INCORPORATED, Kagawa (JP)

( * ) Notice: Subject to any disclaimer, the term of this patent is extended or adjusted under 35 U.S.C. 154(b) by 0 days.

(21) Appl. No.: 16/347,021

(22) PCT Filed: Nov. 6, 2017

(86) PCT No.: PCT/JP2017/039987
§ 371 (c)(1),
(2) Date: May 2, 2019

(87) PCT Pub. No.: WO2018/084294
PCT Pub. Date: May 11, 2018

(65) Prior Publication Data
US 2019/0270908 A1    Sep. 5, 2019

(30) Foreign Application Priority Data

Nov. 7, 2016  (JP) .............................. JP2016-216968

(51) Int. Cl.
| | | |
|---|---|---|
| *C09D 163/00* | (2006.01) | |
| *C09D 7/40* | (2018.01) | |
| *C09D 7/61* | (2018.01) | |
| *B05D 7/16* | (2006.01) | |
| *C09D 201/00* | (2006.01) | |
| *B05D 7/14* | (2006.01) | |
| *C08K 3/36* | (2006.01) | |
| *C08K 3/40* | (2006.01) | |
| *C08K 7/00* | (2006.01) | |

(52) U.S. Cl.
CPC ............. *C09D 163/00* (2013.01); *B05D 7/14* (2013.01); *B05D 7/16* (2013.01); *C09D 7/40* (2018.01); *C09D 7/61* (2018.01); *C09D 7/70* (2018.01); *C09D 201/00* (2013.01); *B05D 2202/10* (2013.01); *B05D 2504/00* (2013.01); *B05D 2601/02* (2013.01); *C08K 3/36* (2013.01); *C08K 3/40* (2013.01); *C08K 7/00* (2013.01); *C08K 2201/003* (2013.01); *C09D 7/69* (2018.01)

(58) Field of Classification Search
CPC .......... C09D 163/00; C09D 7/70; C09D 7/69; C09D 7/61; C08K 3/36; B05D 7/16
See application file for complete search history.

(56) References Cited

U.S. PATENT DOCUMENTS

| | | | | |
|---|---|---|---|---|
| 6,440,258 B1 * | 8/2002 | Imashiro | ............. | C09J 7/10 |
| | | | | 156/331.1 |
| 2008/0257477 A1 * | 10/2008 | Kwak | .............. | C04B 41/009 |
| | | | | 156/98 |
| 2016/0263617 A1 | 9/2016 | Kaji et al. | | |
| 2016/0300810 A1 | 10/2016 | Kanamori et al. | | |

FOREIGN PATENT DOCUMENTS

| | | | | | |
|---|---|---|---|---|---|
| EP | S-5569258 A | * | 5/1980 | ............ | C03C 27/10 |
| JP | 55-69258 | | 5/1980 | | |
| JP | 63-218284 | | 9/1988 | | |
| JP | 2005-334759 | | 8/2005 | | |
| JP | 2006-502944 | | 1/2006 | | |

OTHER PUBLICATIONS

International Search Report issued in International Patent Application No. PCT/JP2017/039987, dated Jan. 9, 2018.
International Preliminary Report on Patentability Chapter II in International Patent Application No. PCT/JP2017/039987, dated Mar. 29, 2019 (English Translation).
Extended European Search Report issued with respect to Application No. 17866523.8, dated Jun. 23, 2020.

* cited by examiner

*Primary Examiner* — Robert D Harlan
(74) *Attorney, Agent, or Firm* — Greenblum & Bernstein, P.L.C.

(57) ABSTRACT

Provided is a coating composition capable of forming a coating film which exhibits excellent durability and is suitable for repair. It is a coating composition containing a resin component and a pigment, in which a linear expansion coefficient at a temperature equal to or less than a glass transition temperature of a nonvolatile component is $3.2 \times 10^{-5}$/K or less.

10 Claims, 1 Drawing Sheet

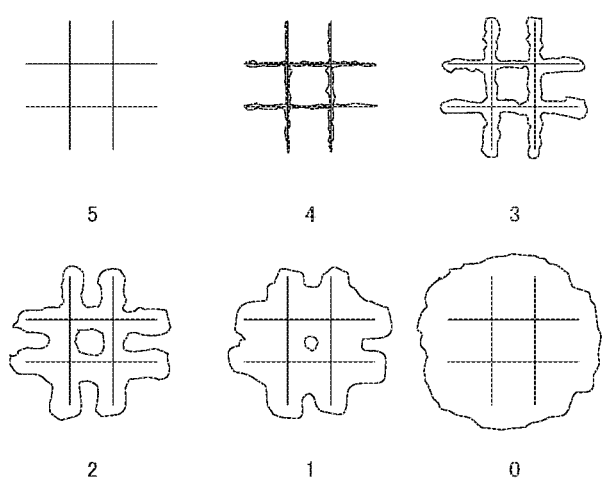

COATING COMPOSITION, COATING FILM, AND COATING METHOD

TECHNICAL FIELD

The present invention relates to a coating composition, a coating film formed from the coating composition, and a coating method using the coating composition, particularly to a coating composition capable of forming a coating film which exhibits excellent durability and is suitable for repair.

BACKGROUND ART

Coated articles are required to be repaired as the coating film degrades. In particular, structures (buildings and non-building structures) which are built/constructed outdoors are exposed to sunlight, rain, and wind and repeatedly undergo repair work since the degradation of coating film thereof quickly proceeds.

For example, steel structures such as bridges are in an environment of being exposed to wind and rain and thus being likely to rust, and thus coating methods thereof are investigated from the viewpoint of anticorrosion property.

In addition, JP 2005-334759 A (Patent Document 1) proposes a method for repair-coating an existing coating film (also referred to as old coating film) by which it is possible to repair-coat the existing coating film so that shrinkage, cracking, peeling off and the like are not caused without removing the existing coating film and to coat it with thick film type coating materials and finish coating materials. In the technique described in Patent Document 1, attention is paid to the elongation percentage of the repair coating film solely in order to follow the expansion and contraction of the old coating film occurring at the time of repair.

CITATION LIST

Patent Literature

Patent Literature 1: JP 2005-334759 A

SUMMARY OF INVENTION

Technical Problem

However there is a case in which peeling off of the repair coating film occurs even if the technique described in Patent Document 1 is used, and there is still room for improvement in adhesive power of the repair coating film.

Accordingly, an object of the present invention is to solve the above-described problems of the conventional art and to provide a coating composition capable of forming a coating film which exhibits excellent durability and is suitable for repair. In addition, another object of the present invention is to provide a coating film which exhibits excellent durability and is suitable for repair and a coating method for forming the coating film.

Solution to Problem

The present inventors have conducted investigations on the peeling off of the repair coating film, and as a result, have found out that peeling off of the old coating layer is likely to occur particularly as recoating of the repair coating film is repeated or the film thickness is increased. It is considered that this is because the internal stress of the coating film is increased since the coating film formed by recoating is thickened, the adhesive property of the coating film is thus diminished, and peeling off of the coating film is thus likely to occur.

In order to decrease the internal stress of the coating film, a method in which the glass transition temperature of the coating film is lowered and a method in which the elastic modulus of the coating film is lowered are known. These methods have been investigated for the purpose of decreasing the internal stress of the coating film, but the blocking property with respect to corrosive substances are diminished and the anticorrosion property tends to deteriorate as the glass transition temperature and the elastic modulus are lowered. Such a result is an undesirable result for a steel structure such as a bridge, for example.

Accordingly, the present inventors have paid attention to the linear expansion coefficient of the coating film. As presented in the following Relational Expression (1), it has bees known that stress is also decreased as the linear expansion coefficient is decreased, but it cannot be said that attention has been paid to the linear expansion coefficient of the coating film as a method for decreasing the internal stress of the coating film since the linear expansion coefficient usually increases when the glass transition temperature or elastic modulus is lowered.

[Math. 1]

$$\sigma = \int_{T_1}^{T_2} \alpha \cdot E \, dT \quad (1)$$

In Relational Expression (1), $\sigma$ denotes a stress, $\alpha$ denotes a linear expansion coefficient, E denotes an elastic modulus, $T_1$ denotes a temperature on a low temperature side, and $T_2$ denotes a temperature on a high temperature side.

For example, a corrosion preventing method has been proposed in which a coating film having a specific linear expansion coefficient is formed on the surface of a metal structure, but in such a corrosion preventing method, the linear expansion coefficient of the coating film is regulated in order to impart followability to the coating film with respect to the load of the metal member and the movement thereof due to thermal expansion and contraction. A method for improving the durability of coating film by decreasing the difference in the thermal expansion coefficient between the coating film and the metal which is an object to be coated in this manner is known, but the investigations on the linear expansion coefficient from the viewpoint of decreasing the internal stress of coating film have not been sufficiently conducted.

The linear expansion coefficient changes depending on the glass transition temperature, and thus Relational Expression (1) can be expressed as the following Relational Expression (2). In addition, there is generally a relation of $E_1 \gg E_2$ although there is a relation of $\alpha_1 < \alpha_2$, and thus the influence of the high temperature side (the second term on the right side) from the glass transition temperature on the right side of Relational Expression (2) is smaller as compared with that of the low temperature side (the first term on the right side) from the glass transition temperature.

[Math. 2]

$$\sigma = \int_{T_1}^{T_g} \alpha_1 \cdot E_1 \, dT + \int_{T_g}^{T_2} \alpha_2 \cdot E_2 \, dT \quad (2)$$

In Relational Expression (2), $\sigma$ denotes a stress, $\alpha_1$ denotes a linear expansion coefficient on a low temperature side from a glass transition temperature, $\alpha_2$ denotes a linear expansion coefficient on a high temperature side from a glass transition temperature, $E_1$ denotes an elastic modulus on a low temperature side from a glass transition temperature, $E_2$ denotes an elastic modulus on a high temperature side from a glass transition temperature, $T_g$ denotes a glass transition temperature, $T_1$ denotes a temperature on a low temperature side, and $T_2$ denotes a temperature on a high temperature side.

The present inventors have further conducted investigations, found out that it is possible to greatly prevent peeling off of the coating film and to provide a coating film which exhibits excellent durability and is suitable for repair by lowering the linear expansion coefficient on the low temperature side from the glass transition temperature to a specific range, and thus accomplished the present invention.

In addition, the present inventors have also found out that the peeling off preventing effect is also enhanced as the film thickness is larger in a coating film of which the linear expansion coefficient $\alpha_1$ is lowered to a specific range. It is generally considered that the peeling off preventing effect is diminished as the film thickness is larger since the internal stress also increases, and thus the effect of the present invention is surprising from this point as well. Incidentally, the clear reason for obtaining such an effect is unknown at the present stage, but it is considered that this is because the rigidity of the coating film is higher as the coating film is thicker.

Furthermore, the present inventors have also found out that the peeling off preventing effect is further improved when the linear expansion coefficient $\alpha_2$ of the coating film of which the linear expansion coefficient $\alpha_1$ has been lowered to a specific range as described above is also lowered to a specific range.

That is, the coating composition of the present invention is a coating composition comprising a resin component and a pigment, in which a linear expansion coefficient at a temperature equal to or less than a glass transition temperature of a nonvolatile component is $3.2 \times 10^{-5}$/K or less.

In a preferred example of the coating composition of the present invention, the linear expansion coefficient is $2.5 \times 10^{-5}$/K or less.

In another preferred example of the coating composition of the present invention, the linear expansion coefficient is $2.0 \times 10^{-7}$K or less.

In another preferred example of the coating composition of the present invention, a linear expansion coefficient at a temperature equal to or more than the glass transition temperature of the nonvolatile component is $3.0 \times 10^{-5}$/K or less.

In another preferred example of the coating composition of the present invention, the linear expansion coefficient at a temperature equal to or more than the glass transition temperature of the nonvolatile component is $2.0 \times 10^{-3}$/K or less.

In another preferred example of the coating composition of the present invention, the coating composition is to be applied onto a structure.

In another preferred example of the coating composition of the present invention, the coating composition is to be used for repair of a steel structure.

In addition, the coating film of the present invention is a coating film comprising a resin and a pigment, in which a linear expansion coefficient at a temperature equal to or less than a glass transition temperature of the coating film is $3.2 \times 10^{-5}$/K or less.

Furthermore, the coating method of the present invention comprises a step of coating an object to be coated with a coating composition comprising a resin component and a pigment to form a coating film having a linear expansion coefficient of $3.2 \times 10^{-5}$/K or less at a temperature equal to or less than a glass transition temperature of the coating film.

In a preferred example of the coating method of the present invention, the object to be coated is a steel structure.

In another preferred example of the coating method of the present invention, the coating method is a coating method for repair and the step is repeated every time repair is conducted.

Advantageous Effects of Invention

According to the coating composition of the present invention, it is possible to provide a coating composition capable of forming a coating film which exhibits excellent durability and is suitable for repair by setting the linear expansion coefficient at a temperature equal to or less than the glass transition temperature of nonvolatile component to $3.2 \times 10^{-5}$/K or less.

In addition, according to the coating film of the present invention, it is possible to provide a coating film which exhibits excellent durability and is suitable for repair. Furthermore, according to the coating method of the present invention, it is possible to provide a coating method by which a coating film which exhibits excellent durability and is suitable for repair is formed.

BRIEF DESCRIPTION OF DRAWINGS

FIG. 1 illustrates the evaluation criteria on coating film defects at a # pattern portion in a heat cycle peel test.

DESCRIPTION OF EMBODIMENTS

<Coating Composition>

Hereinafter, the coating composition of the present invention will be described in detail. The coating composition of the present invention is a coating composition comprising a resin component and a pigment, in which a linear expansion coefficient at a temperature equal to or less than a glass transition temperature of nonvolatile component is $3.2 \times 10^{-5}$/K or less. According to the coating composition of the present invention, peeling off of the coating film can be greatly prevented by setting the linear expansion coefficient at a temperature equal to or less than the glass transition temperature of nonvolatile components to 3 $2 \times 10^{-5}$/K or less. Incidentally, the linear expansion coefficient at a temperature equal to or less than the glass transition temperature is also referred to as linear expansion coefficient $\alpha_1$.

In this manner, the coating film to be formed from the coating composition of the present invention exhibits excellent durability and is thus suitable for repair, and is preferably used, for example, for the repair of structures built/constructed outdoors, particularly for the repair of steel structures such as bridges. Moreover, it is preferable that the coating composition of the present invention is an ordinary-temperature-drying type coating composition or a two-liquid-reaction type coating composition from the viewpoint of being adapted to repair of outdoor structures.

In addition, the coating film to be formed from the coating composition of the present invention exhibits a greater peeling off preventing effect as the film thickness thereof is larger, and thus the coating composition of the present invention is also excellent for thick film coating but the coating composition can be suitably applied onto the old coating film without removing the old coating film particularly when repair is repeatedly conducted. In a case in which repair is repeatedly conducted in this manner, a remarkable peeling off preventing effect can be exerted when a coating film having a film thickness of, for example, from 25 to 500

μm, preferably from 25 to 150 μm is formed by one time of repair or when a thick film is formed so that the film thickness of the entire coating film including the old coating film exceeds 500 μm by repeatedly conducting repair on the old coating film as long as the repair is repeated using the coating composition of the present invention. For this reason, the coating composition of the present invention is preferably used for recoating repair.

In the coating composition of the present invention, the nonvolatile components refer to components excluding volatile components such as water and an organic solvent and are components which finally form the coating film. Understandably, the resin component and the pigment are nonvolatile components. Incidentally, in the present invention, the components remaining when the coating composition is dried at 150° C. for 10 hours is handled as nonvolatile components since the linear expansion coefficient is high when the volatile components remain.

The internal stress of the coating film is also lower as the linear expansion coefficient c of nonvolatile components is lower. Hence, in the coating composition of the present invention, the lower limit of the linear expansion coefficient $\alpha_1$ is not particularly limited but is preferably $1.5\times10^{-5}$/K or more and still more preferably $1.8\times10^{-5}$/K or more for the reason that the anticorrosion property, coating workability, appearance of the coating film and the like are diminished, for example, when a large amount of pigment is added in order to lower the linear expansion coefficient $\alpha_1$. In addition, the linear expansion coefficient $\alpha_1$ is preferably less than $3.2\times10^{-5}$/K, still more preferably $2.5\times10^{-5}$/K or less, and yet still more preferably $2.0\times10^{-5}$/K or less from the viewpoint of securing the adhesive property of the coating film for a significantly long time, for example, in a structure in which the adhesive property of the coating film is remarkably diminished by aging degradation.

In addition, the linear expansion coefficient at a temperature equal to or more than the glass transition temperature of nonvolatile components is preferably $3.0\times10^{-5}$/K or less and more preferably $2.0\times10^{-5}$/K or less from the viewpoint of further improving the peeling off preventing effect. Incidentally, the linear expansion coefficient at a temperature equal to or more than the glass transition temperature is also referred to as linear expansion coefficient $\alpha_2$. In addition, the internal stress of the coating film is also lower as the linear expansion coefficient at a temperature equal to or more than the glass transition temperature of nonvolatile components is lower. Hence, in the coating composition of the present invention, the lower limit of the linear expansion coefficient $\alpha_2$ is not particularly limited but is preferably $1.0\times10^{-5}$/K or more for the reason that the anticorrosion property, coating workability, appearance of the coating film and the like are diminished, for example, when a large amount of pigment is added in order to lower the linear expansion coefficient $\alpha_2$.

In the coating composition of the present invention, the linear expansion coefficient of nonvolatile components is measured as follows.

Reference Literature 1: The instruction manual for Shimadzu Thermomechanical Analyzer TMA-60/60H, Shimadzu Corporation, May 2014

Reference Literature 2: The instruction manual for Shimadzu Thermal Analysis Workstation TA-60WS, Shimadzu Corporation, February 2014

Method for Measuring Linear Expansion Coefficient

The coating material to be measured is applied onto a tin plate (0.3 mm×75 mm×150 mm) having a clean surface to produce a coating film. This operation is conducted one time a day until the dried film thickness reaches about 6 mm or more. At that time, the coating direction is crossed every time in order to produce a uniform coating film.

The coating film having a dried film thickness of 6 mm or more is released from the tin plate and shaped using sandpaper and the like so as to form a prism of about 6 mm×6 mm×20 mm, and then the mass thereof is precisely weighed. Thereafter, the coating film is heated and cured in a constant temperature bath at 150° C. for 10 hours and then precisely weighed again, and the mass decrease percentage before and after the heating and curing in a constant temperature bath at 150° C. for 10 hours is calculated by the following equation. The heating and curing is repeated until the mass decrease percentage before and after heating and curing falls within 1%.

$$\text{Mass decrease percentage} (\%) = \frac{\text{Mass immediately before heating and curing} - \text{Mass after heating and curing}}{\text{Mass immediately before heating and curing}} \times 100 \quad [\text{Math. 3}]$$

The prism of about 6 mm×6 mm×20 mm which has been heated and cured is shaped into a prism of 4 mm×4 mm×15 mm using sandpaper (#240). At this time, the polishing work is conducted while measuring the size using a caliper and the like so that the error of the sample for measurement is within 4 mm ±0.5 mm and. 15 mm ±1 mm, The linear expansion coefficient was measured using Shimadzu Thermomechanical Analyzer TMA-60 manufactured by Shimadzu Corporation. In order to conduct the measurement from −50° C., a low temperature furnace LTB-60 was used as an accessory. The change in sample length. (linear expansion amount) along with the temperature rise of the sample from −50° C. to +120° C. is measured at a sampling interval of 1 second. From the graph obtained, two points are designated in a section in which a proportional relation between the temperature rise and the expansion coefficient is acknowledged, and $\alpha_1$ and $\alpha_2$ are obtained from the gradient of that section.

Incidentally, the glass transition temperature described in the present invention refers to the temperature at which the linear region having a gradient of $\alpha_1$ and the linear region having a gradient of $\alpha_2$ intersect.

Incidentally, in the coating composition of the present invention, the glass transition temperature of nonvolatile components is, for example, from 30° C. to 120° C., but it is preferably from 40° C. to 80° C. from the viewpoint of adapting the coating composition to repair of outdoor structures.

In the coating composition of the present invention, the linear expansion coefficient at a temperature equal to or less than the glass transition temperature of nonvolatile components can be lowered by increasing the proportion of the pigment in the nonvolatile components regardless of the kind of resin component and the kind of pigment. As the reason for this, it is mentioned that linear expansion coefficient of the pigment is smaller than that of the resin when comparing the resin and the pigment which are used in the coating composition with each other. The relation between the proportion of the pigment in the nonvolatile components and the linear expansion coefficient $\alpha_1$ is presented in the following Table 1.

TABLE 1

| | | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|---|
| Amount of target pigment in nonvolatile component (% by weight) | | — | 38.5 | 55.5 | 67.6 | 23.7 | 35.4 | 43.7 | 7.2 | 13.4 | 23.8 | 35.4 | 18.9 | 31.8 | 13.5 | 23.7 | 21.3 | 37.4 | 46.6 | 53.9 | 60.9 |
| Main agent | JER1001X75 | 42.2 | 27.0 | 19.9 | 14.9 | 33.0 | 28.3 | 24.8 | 39.5 | 37.0 | 33.0 | 28.3 | 34.9 | 29.7 | 37.0 | 33.0 | 33.3 | 27.5 | 23.6 | 20.5 | 17.5 |
| | NIKANOL LLL | 7.1 | 4.5 | 3.3 | 2.4 | 5.5 | 4.7 | 4.1 | 6.6 | 6.2 | 5.3 | 4.7 | 5.8 | 5.0 | 6.2 | 5.5 | 5.6 | 4.6 | 3.9 | 3.4 | 2.9 |
| | K-WHITE#82 | 7.1 | 4.5 | 3.3 | 2.4 | 5.5 | 4.7 | 4.1 | 6.6 | 6.2 | 5.3 | 4.7 | 5.8 | 5.0 | 6.2 | 5.5 | 5.6 | 4.6 | 3.9 | 3.4 | 2.9 |
| | Glass flakes, small particle diameter | — | 36.0 | 53.0 | 65.0 | — | — | — | — | — | — | — | — | — | — | — | — | — | — | — | — |
| | Glass flakes, middle particle diameter | — | — | — | — | 22.0 | 33.0 | 41.3 | — | — | — | — | — | — | — | — | — | — | — | — | — |
| | Glass flakes, large particle diameter | — | — | — | — | — | — | — | 6.6 | 12.3 | 22.0 | 33.0 | — | — | — | — | — | — | — | — | — |
| | Spherical silica | — | — | — | — | — | — | — | — | — | — | — | — | — | — | — | 21.1 | 35.2 | 44.1 | 51.4 | 58.5 |
| | Mica, medium particle diameter | — | — | — | — | — | — | — | — | — | — | — | 17.4 | 29.7 | — | — | — | — | — | — | — |
| | Mica, large particle diameter | — | — | — | — | — | — | — | — | — | — | — | — | — | 12.3 | 22.0 | — | — | — | — | — |
| | BENGALA 130R | 14.1 | 9.0 | 6.6 | 4.9 | 11.0 | 9.4 | 8.3 | 13.2 | 12.3 | 11.0 | 9.4 | 11.6 | 9.9 | 12.3 | 11.0 | 11.1 | 9.2 | 7.9 | 6.8 | 5.8 |
| | DISPARLON D4200-20X | 1.4 | 0.9 | 0.7 | 0.5 | 1.1 | 0.9 | 0.8 | 1.3 | 1.2 | 1.1 | 0.9 | 1.2 | 1.0 | 1.2 | 1.1 | 1.1 | 0.9 | 0.8 | 0.7 | 0.6 |
| | DISPARLON OX-66 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| | KBM403 | 1.4 | 0.9 | 0.7 | 0.5 | 1.1 | 0.9 | 0.8 | 1.3 | 1.2 | 1.1 | 0.9 | 1.2 | 1.0 | 1.2 | 1.1 | 1.1 | 0.9 | 0.8 | 0.7 | 0.6 |
| | Xylene | 13.9 | 9.0 | 6.5 | 5.0 | 10.8 | 9.4 | 8.2 | 13.0 | 12.3 | 10.8 | 9.4 | 11.5 | 9.7 | 12.3 | 10.8 | 11.0 | 8.9 | 7.8 | 6.8 | 5.8 |
| | Methyl isobutyl ketone | 12.7 | 8.1 | 5.9 | 4.3 | 9.9 | 8.6 | 7.5 | 11.8 | 11.2 | 9.9 | 8.6 | 10.5 | 8.9 | 11.2 | 9.9 | 10.0 | 8.1 | 7.1 | 6.2 | 5.3 |
| Sum of main agent (parts by mass) | | 100.0 | 100.0 | 100.0 | 100.0 | 100.0 | 100.0 | 100.0 | 100.0 | 100.0 | 99.6 | 100.0 | 100.0 | 100.0 | 100.0 | 100.0 | 100.0 | 100.0 | 100.0 | 100.0 | 100.0 |
| Curing agent | SUNMIDE 150-65 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 |
| Sum of curing agent (parts by mass) | | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 |
| Mass ratio mixed | Main agent | 76.0 | 78.0 | 82.6 | 87.0 | 74.0 | 77.0 | 79.0 | 69.9 | 71.7 | 74.0 | 77.0 | 72.9 | 76.0 | 72.0 | 74.0 | 73.8 | 77.3 | 79.9 | 82.0 | 84.2 |
| | Curing agent | 24.0 | 22.0 | 17.4 | 13.0 | 26.0 | 23.0 | 21.0 | 30.1 | 28.3 | 26.0 | 23.0 | 27.1 | 24.0 | 28.0 | 26.0 | 26.2 | 22.7 | 20.1 | 18.0 | 15.8 |
| Nonvolatile component in mixed coating material (% by mass) | | 62.2 | 72.9 | 78.9 | 83.6 | 68.6 | 71.9 | 74.6 | 64.2 | 65.7 | 68.3 | 71.9 | 67.2 | 71.0 | 65.7 | 68.6 | 68.3 | 72.8 | 75.6 | 78.2 | 80.9 |
| Linear expansion coefficient ($\alpha_1$) × $10^{-5}$/K | | 8.1 | 5.5 | 4.5 | 3.4 | 4.3 | 3.0 | 2.5 | 6.0 | 4.5 | 3.1 | 2.0 | 5.3 | 3.4 | 5.2 | 3.6 | 6.9 | 5.4 | 4.7 | 3.8 | 3.2 |

As can be seen from Table 1, it is possible to lower the linear expansion coefficient $\alpha_1$ of nonvolatile components by increasing the proportion of the pigment in the nonvolatile components. In addition, it can be seen that the linear expansion coefficient $\alpha_1$ is also affected by the kind of pigment. In other words, it can be seen that a greater effect of lowering the linear expansion coefficient $\alpha_1$ is obtained with a smaller amount of pigment when the shape of pigment is a scaly shape rather than a spherical shape and further the effect of lowering the linear expansion coefficient $\alpha_1$ is greater when the particle diameter is larger even in the case of the same scaly pigment.

Incidentally, it is also possible to lower the linear expansion coefficient $\alpha_2$ by the same method, but the linear expansion coefficient $\alpha_2$ is affected by the particle diameter of pigment more than the linear expansion coefficient $\alpha_1$. Hence, the effect of lowering the linear expansion coefficient $\alpha_2$ by a pigment having a larger particle diameter is greater than the effect of lowering the linear expansion coefficient $\alpha_1$.

In the coating composition of the present invention, the total content of the resin component and pigment in the nonvolatile components is preferably 95% or more by mass and still more preferably from 98% to 100% by mass. It is easy to adjust the linear expansion coefficient of nonvolatile components when the total content of the resin component and pigment in the nonvolatile components is 95% or more by mass.

The content of nonvolatile components in the coating composition of the present invention is not particularly limited, but the content of nonvolatile components is preferably from 40% to 100% by mass and still more preferably from 50% to 85% by mass from the viewpoint of improving the coating workability and the finish appearance of the coating film.

In addition, it is preferable that the average particle diameter of pigments in the nonvolatile components is 50 μm or less from the viewpoint of improving the finish appearance of the coating film. The smoothness of the coating film is likely to be obtained when the average particle diameter is 50 μm or less.

In the coating composition of the present invention, the resin component includes not only the resin itself but also a substance which forms a resin by curing at the time of coating. For example, when the coating composition is a one-liquid type, a coating composition comprising a resin itself as to be described later is used in number of cases. As a two-liquid type coating composition, a coating composition which is composed of a main agent comprising a polyol compound and a curing agent comprising an isocyanate compound and forms a urethane resin by curing at the time of coating, and the like are also known. In such a coating composition, the polyol compound and isocyanate compound which are the substances forming a urethane resin correspond to the substances which form a resin by curing at the time of coating. In addition, as an ultraviolet curable coating composition, a coating composition which comprises an acrylate monomer or oligomer and forms an acrylic resin by curing at the time of coating, and the like are also known. In such a coating composition, the acrylate monomer or oligomer which is a substance forming an acrylic resin corresponds to a substance which forms a resin by curing at the time of coating.

In the coating composition of the present invention, the resin which can be used as a resin component and the resin which is formed from a resin component by curing at the time of coating are not particularly limited, and examples thereof may include resins which are commonly used in the industry of coating material, regardless of water-based, solvent-based, solventless. Specific examples thereof may include an acrylic resin, a silicone resin, an acrylic silicone resin, a styrene acrylic copolymer resin, a polyester resin, a fluororesin, a rosin resin, a petroleum resin, a coumarone resin, a phenol resin, a urethane resin, a melamine resin, a urea resin, an epoxy resin, a cellulose resin, a xylene resin, an alkyd resin, an aliphatic hydrocarbon resin, a butyral resin, a maleic acid resin, a fumaric acid resin, a vinyl resin, an amine resin, and a ketimine resin. These resins may be used alone or in combination of two or more. Among them, an epoxy resin, and an acrylic resin, acrylic silicone resin and polyester resin having a plurality of hydroxyl groups (a resin having a plurality of hydroxyl groups is also referred to as a polyol resin) are preferable. Specifically, a reaction-curing type coating composition comprising an epoxy resin and an amine compound as a resin component and a reaction-curing type coating composition comprising a polyol resin as described above and an isocyanate as a resin component are preferable.

As the epoxy resin, for example, JER 1001, JER 1004, JER 1007, JER 806, JER 807, JER 1001×75, JER 168V70, JER 152, JER 154, JERN 2801, JERW 1155R55, and. JER-W3435R67 (manufactured by Mitsubishi Chemical Corporation.), EPOTOHTO YD-127 and EPOTOHTO YDPN-638 (manufactured by NIPPON STEEL & SUMIKIN CHEMICAL CO., LTD.), EPICLON 830, EPICLON 840, EPICLON 850, EPICLON 1050, EPICLON 1055, EPICLON HP-7200, EPICLON HP-7200L, EPICLON HP-4770, EPICLON HP-820, EPICLON 5500-60, EPICLON 5900-60, EPICLON N-680, and EPICLON N-770 (manufactured by DIC Corporation), ADEKA. RESIN EP-4100, ADEKA RESIN EP-4500, ADEKA GLYCIROL ED-502, ADEKA GLYCIROL ED-505, and ADEKA RESIN EM-101-50 (manufactured by ADEKA Corporation), HARIPOL EP-450, HARIPOL EP-497, and HARIPOL EP-528 (manufactured by Harima Chemicals Group, Inc.), EPODIL 748 and EPODIL 759 (manufactured by Air Products and Chemicals, Inc.), Cardolite NX4764 (manufactured by Cardolite Corporation), Cardura El0 (manufactured by HEXION Specialty Chemicals, Inc.), EPOLSON EA1, 2, 3, 7, 12, 20, 55 and HD2 (manufactured by Henkel Japan Ltd.), YUKARESIN KE-002, KE -116, E-1022, and KE-301C (manufactured by YOSHIMURA OIL CHEMICAL Co., Ltd.), BECKOPDX EP 2381 (manufactured by ALLNEX), EPI-REZ 6530-WH-53 (manufactured by Momentive), and the like can be used.

More preferably, a coating composition is preferable which does not cause lifting of the old coating film even in the case of being applied onto the old coating film and comprises a modified epoxy resin which is soluble in weak solvents such as an aliphatic hydrocarbon-based solvent and an aromatic hydrocarbon-based solvent having a high boiling point and an amine resin. Examples of such a modified epoxy resin soluble in a weak solvent may include an alkylphenol-modified epoxy resin, a fatty acid-modified epoxy resin, and an alkyl glycidyl ether.

Examples of commercially available products of such a modified epoxy resin may include EPIKOTE 168V70 (manufactured by Mitsubishi Chemical Corporation), EPICLON 5900-60 and EPICLON HP-820 (manufactured by DIC Corporation), EPODIL 748 and EPODIL 759 (manufactured by Air Products and Chemicals, Inc.), Cardolite NX4764 (manufactured by Cardolite Corporation), HARIPOL EP-450 and HARIPOL EP-497 (manufactured by Harima Chemicals Group, Inc.), Cardura E10 (manufactured by HEXION Specialty Chemicals, Inc.), and ADEKA GLYCIROL ED-502, ADEKA GLYCIROL ED 503, and ADEKA GLYCIROL ED-505 (manufactured by ADEKA Corporation).

In addition, a water-based coating composition is preferable which does not cause lifting of the old coating film even in the case of being applied onto the old coating film and further comprises an aqueous epoxy resin in the case of considering the environmental problems caused by VOC and the like.

Among the above-mentioned epoxy resins, examples of the epoxy resin applicable to a water-based coating material may include JERW 2801, JERW 1155R55, JER-W3435R67, EPOLSON EA1, 2, 3, 7, 12, 20, 55 and HD2, YUKARESIN KE-002, KE-116, E-1022, and KE-301C, ADEKA RESIN EM-101-50, and BECKOPDX EP 2381 and EPI-REZ 6530-WH-53.

Meanwhile, examples of commercially available products of the amine resin. may include LUCKAMIDE WN-405, LUCKAMIDE WN-620, LUCKAMIDE WH-614, LUCKAMIDE F4, and LUCKAMIDE WH-650 (manufactured by DIC Corporation), TOHMIDE 215-70X, TOHMIDE 225-X, TOHMIDE TXS-53-C, TOHMIDE Th S-67 TOHMIDE TXS-685-A, TOHMIDE TXS-694, FUJICURE FXI-919, FUJICURE FXH-927, FUJICURE FXH-935, FUJICURE 4011, FUJICURE 4025, and FUJICURE 4030 (manufactured by T&K TOKA Corporation), VERSAMINE 340 1N, VERSAMINE 551, and VERSAMINE 552 (manufactured by BASF Japan Ltd.), SUNMIDE 150-65, SUNMIDE WE-910, ANCAMTNE 2280, ANCAMINE 2643, and ANCAMIDE 350A (manufactured. by Air Products and Chemicals, Inc.), JERCURE XD #639, JERCURE ST11, JERCURE ST12, JERCURE ST13, JERCURE SL11, and JERCURE WD11M60 (manufactured by Mitsubishi Chemical Corporation), ADEKA HARDENER. EH-235R-2 and ADEKA HARDENER EH-4163X (trade name, manufactured by ADEKA Corporation), Vegechem Green V115, Vegechem Green V125, Vegechem Green V140, and Vegechem Green G747 (manufactured by TSUNO CO., LTD.), =FAMINE D-230 and JEFFAMINE T-403 (manufactured by Huntsman Corporation), NEWMIDE 511-55 and NEWMIDE 3510 (manufactured by Harima Chemicals Group, Inc.), Daitocurar I-5986, Daitocurar I-6020, Daitocurar X-56631-1, and Daitocurar X-6102 (manufactured by DAITO SANGYO CO., LTD.), and BECKOPDX EH 613W/80WA and BECKOPDX EH 623W/80WA (manufactured by Silrface Specialty Japan Co., Ltd.). Among the above-mentioned amine resins, there are JERCURE XD #639 and ADEKA HARDENER EH-235R-2 as those that can be used in weak solvent-based coating materials. In addition, among the above-mentioned amine resins, examples of those applicable to water-based coating materials may include TOHMIDE TXS-53-C, TOHMIDE TXS-674-B, TOHMIDE TXS-685-A, TOHMEDE TXB-694, FUJICURE FXI-919, FUJICURE FXH-927, FUJICURE FXH-935, SUNMIDE WH-910, JERCURE WD11M60, ADEKA HARDENER EH-4163X, Daitocurar I-5986, Daitocurar I-6020, Daitocurar X-5663H, Daitocurar X-6102, BECKOPDX EH 613W/80WA, and BECKOPDX EH 623W/80WA.

In addition, it is preferable to use a modified resin from the viewpoint of enhancing the anticorrosion property or obtaining a coating film having a favorable appearance. In a case in which a modified resin is used, the dispersion stability of pigment tends to be improved and it is possible to improve the wetting of pigment and to improve the compactness of the coating film and the appearance of the coating film. In addition, the modified resin can also provide an effect of lowering the linear expansion. coefficients $\alpha_1$ and $\alpha_2$. Incidentally, modification examples of the epoxy resin and polyol resin may include modification with alkyl, modification with alkyl ether, modification with alkylphenol novolac, modification with acryl, modification with fatty acid, modification. with urethane, modification with amine, modification with isocyanate, modification with silicone, and graft modification using an allyl group. In addition, modification examples of the amine compound and isocyanate may include modification with epoxy, modification with phenol, modification with mannich, modification with acrylic polyol, modification with polyether polyol, modification with polyester polyol, and modification with polyester polyol.

In addition, two or more kinds of resins may be blended and used apart from the method using a modified resin. For example, it is preferable to blend a hydrocarbon resin with the epoxy resin or polyol resin.

For example, as a hydrocarbon resin, an aromatic hydrocarbon resin such as a xylene resin or an aliphatic hydrocarbon resin can be used. In addition, a hydrocarbon resin modified with phenol and the like can also be used. As the hydrocarbon resin, for example, NIKANOL L, NIKANOL LL, NIKANOL ILL, NIKANOL Y-50, and NIKANOL Y-100 (manufactured by Fudow Company Limited), Necires EPX-L and Necires EPX-L2 (manufactured by Nevcin), Hirenol PL-1000S (manufactured by KOLON INDUSTRIES INC.), and Nisseki Neopolymer E-100, Nisseki Neopolymer E-130, and Nisseki Neopolymer 130S (manufactured by JXTG Nippon Oil & Energy Corporation) can be used.

It is preferable that the content of resin component in the coating composition of the present invention is, for example, from 5% to 70% by mass. In addition, in the coating composition of the present invention, it is more preferable that the modified resin is contained at from 1% to 70% by mass from the viewpoint, of enhancing the anticorrosion property or obtaining a coating film having a favorable appearance.

The pigment to be used in the coating composition of the present invention is not particularly limited, and pigments which are commonly used in the industry of coating material can be used. Specific examples thereof may include coloring pigments such as titanium dioxide, iron oxide, and carbon black, extender pigments such as silica, talc, mica, calcium carbonate, and barium sulfate, rust preventive pigments such as zinc, zinc phosphate, aluminum phosphate, zinc molybdate, barium metaborate, and hydrocalumite, luster pigments such as aluminum, nickel, chromium, tin, copper, silver, platinum, gold, and stainless steel, scaly pigments such as glass flakes and graphite, and other acicular and fibrous pigments. The pigment to be used is preferably a pigment which lowers the linear expansion coefficient α of the coating film, and a pigment having a larger particle diameter is preferable in case of the same composition. These pigments may be used alone or in combination of two or more. In addition, in the coating composition of the present invention, the pigment is preferably a rust. preventive pigment and a scaly pigment from the viewpoint of anticorrosion property. Hence, it is preferable that the pigment to be used in the coating composition of the present invention includes at least one of a rust preventive pigment and a scaly pigment from the viewpoint of adapting the coating composition to repair of outdoor structures.

As the rust preventive pigment, for example, Heucophos ZPA, Heucophos ZPO, Heucophos ZMP, Heucophos ZAPP, Heucophos SAPP, Heucophos SRPP, Heucophos ZAMplus, and Heucophos ZCPpius (manufactured by Heubach GmbH), K-WHITE #82, K-WHITE #84, K-WHITE 884S, K-WHITE #85, K-WHITE #105, K-WHITE #140W, K-WHITE 105, K-WHITE #450H, and K-WHITE Ca650 (manufactured by TAYCA CORPORATION), and LF BOUSEI ZP-DL, LF BOUSEI P-WF, LF BOUSEI ZP-50S, LB BOUSEI ZP-SB, LF BOUSEI ZP-HS, LF BOUSEI CP-Z, LIP BOUBEI MZP-500, LIP BOUSEI PMG, LF BOUSEI MP-620, LF BOUSEI ZP-600, LF BOUSEI M-PSN, LF BOUSEI MC-400WR, LF BOUSEI PM-300, LF BOUSEI PM-300C, and LF BOUSEI PM-308 (manufactured by KIKUCHI COLOR Co., Ltd.) can be used.

As the extender pigment, for example, CROWN TALC P, CROWN TALC R, CROWN TALC SC, CROWN TALC C, CROWN TALC Z, CROWN TALC HS, and CROWN TALC 3S (manufactured by Matsumura Sangyo Co., Ltd.), P Talc, PS Talc, TTK Talc, TT Talc, and T Talc (manufactured by TAKEHARA KAGAKU KOGYO CO., LTD.), KHP-25, KHP-25B, KHP-20, KHP-20B, KHP-125, KHP-125B, KHP-400, and KHP-400B (manufactured by HAYASHI KASEI CO., LTD.), Talc ML110, Talc ML112, Talc ML115, Talc M(3113, Talc MG115, Talc MS410, Talc MS412, Talc RL119, Talc RL217, Talc RG319, Talc RH415, Talc R5415, Talc RS515, and Talc RS613 (manufactured by FUJI TALC INDUSTRIAL CO., LID>), and Talc 85, Talc 83, Talc H, and. Talc D (manufactured. by Sanyo Clay Industry Co., Ltd.) can be used as talc, and 100 M, 300 M, and 1000 M (manufactured. by OSAKA MICA KOGYO CO., LTD.), Mica A-215, Mica AB-255, Mica A-41S, Mica YM-215, Mica YM-31S, Mica STA-21R, and Mica SB-061R (manufactured by YAMAGUCHI MICA CORPORATION), Suzoraite 350-PO, Suzoraite 325-PO, Suzoraite 325-HK, Suzoraite 325-S, Suzoraite 80-SF, Suzoraite 200-PO, Suzoraite 200-S, Suzoraite 200-HK, Suzoraite 150-NY, Suzoraite 150-PO, and. Suzoraite 150-S (Manufactured by Imerys Specialities Japan Co., Ltd.), MICA WG-160, MICA WG-325, 4-K MICA, MICA C-1000, MICA C-3000, and MICA C-4000 (manufactured by Kings Mountain Minerals Inc.), REPCOMICA S-200HG, REPCOMICA S-325, REPCOMICA S-400, REPCOMICA M-200, REPCOMICA M-325, and REPCOMICA M-400 (manufactured by Repco Co. , Ltd.), and Micro Mica MK-200, Micro Mica MK-200K, Micro Mica MK-300, Micro Mica MK-300K, and Micro Mica KM (Katakura & Co-op. Agri Corporation) can be used as mica. Eckalite 1 and Eckalite ED (manufactured by Inerts Specialities Japan Co., Ltd.) and ASPG90, ASP170, ASP200, ASP400P, and ASP600 (manufactured by BASF SE) can be used as kaolin. AM-200P and BM-200P (manufactured by Titan Kogyo, Ltd.) and MIOX SG, MIOX Micro 50, MIOX Micro 40, MIOX Micro 30, MIOX Micro 20, MIOX Micro 15, and MIOX Micro 10 (manufactured by karntner montanindustrie GmbH) can be used as scaly iron oxide, and Alpaste 1950M, Alpaste 1100M, Alpaste HS-2, Alpaste 1100MA, Alpaste 1700NL, and Alpaste 1200M (manufactured by Toyo Aluminum K.K.) can be used as the aluminum paste.

"SUPER S", "SUPER SSS", "NANO COAT S-25", AND "MC COAT S-10" (all are trade names, manufactured by MARUO CALCIUM CO., LTD.) and "NEOLIGHT SS" and "NEOLIGHT SA-200" (all are trade names, manufactured by TAKEHARA KAGAKU KOGYO CO., LTD.) can be used as calcium. carbonate. "Barium sulfate 100" and "Baryta BF-1" (trade names, manufactured by SAKAI CHEMICAL INDUSTRY CO., LTD.) can be used as barium sulfate. As the glass flakes, for example, "RCF-600", "RCE-160", "REF-015", and "RCF-2300" (all are trade names, manufactured b Nippon Sheet Glass Co., Ltd.) and ECR Type Glassflake GF750 series, ECR Type Glassflake GF500 series, ECR Type Glassflake GF300 series, ECR Type Glassflake GF200 series, ECR Type Glassflake GF100 series, ECR Type Glassflake GF300E, ECR Type Glassflake GF750 nm series, ECR Type Glassflake GF500 nm series, ECR Type Glassflake GF350 nm series, ECR Type Glassflake GF100 nm series, and FAR Type Glassflake GF750C series (manufactured by Glassflake Ltd.) can used.

As the coloring pigment, for example, "A-190", "A-197", "R-25", "R-21", "R-32", "R-7E", "R-5N", "GTP-100", "R-62N", "R-650" "D-918", "D-2667" "D-970", "R-42", "R-45 M", and. "R-38L" (all are trade names, manufactured by SAKAI CHEMICAL INDUSTRY CO., LTD.), "CR-50", "CR-50-2", "CR-63", "CR-57", "CR-58", "CR-58-2", "CR-Super70", "CR-80", "CR-90", "CR-90-2", "CR-93", "CR-95", "CR-97", "C R-953", "R-630", "R-780", "R-780-2", "R-820", "R-830", "R-930", "R-980" "UT 771", and "PF-736" (all are trade names, manufactured by ISHIHARA SANGYO KAISHA, LTD.), "JR-301", "JR-403", "JR-405", "JR-600A", "JR-605", "JR-600E", "JR-603", and "JR-701" (all are trade names, manufactured by Tayca Corporation), "BENGALA 100ED", "BENGALA 120ED", "BENGALA 130ED", "BENGALA 140ED", "BENGALA 160ED", "BENGALA 180ED", "BENGALA 190ED", "KN-R", "KN-V", "BEN GALA 130R", "BENGALA 515R", "BENGALA 580R", "BENGAIA TSY-1", "BENGALA TSY-2", "BENGAIA TSY-3", "BENGALA TSY-4", "BENGALA Y-50N", "BENGALA TSY-1H", "BENGALA KN-370", and "BENGALA HR-390H" (all are trade names, manufactured by TODA KOGYO CORP.), and "#2650", "#2350", "#1000", "#970", "MA8", "MA100", "MA230", "#25", "#10", "#5", and "MA220" (all are trade names, manufactured by Mitsubishi Chemical Corporation) can be used.

As the pigment to be used in the coating composition of the present invention, for example, a pigment having an average particle diameter in a range of from 1 to 1,500 μm can be used. Here, in a case in which the average particle diameter is from 1 to 500 μm, the average particle diameter means a 50% average particle diameter (particle diameter Which. becomes cumulative 50% on a volume basis, median value) obtained as a result of measurement using a laser diffraction/scattering type particle size distribution measuring apparatus. Incidentally, the average particle diameter of scaly pigment in a case in which the average particle diameter is from 1 to 500 μm is represented by the equivalent sphere diameter by a laser diffraction/scattering method.

In a case in which the average particle diameter is more than 500 μm and less than or equal to 1500 μm, the pigment is observed. under an optical microscope and the average value of the particle diameters for arbitrary 50 particles is determined and taken as the average particle diameter. Incidentally, as the average particle diameter of scaly pigment in a case in which the average particle diameter is more than 500 μm and less than or equal to 1500 μm, the average value of longer diameters of arbitrary 50 particles is determined and taker as the average particle diameter.

As the pigment to be used in the coating composition of the present invention, for example, a pigment haying an aspect ratio in a range of from 1 to 750 can be used. Here, the aspect ratio of pigment is determined as the ratio (D/T) of the average particle diameter (D) to the average thickness (T). The average thickness (T) of pigment is obtained by measuring the thickness of pigment using a SEM (scanning electron microscope) or an optical microscope and determining the average value for arbitrary 50 particles.

It is preferable that the content of pigment in the coating composition of the present invention is, for example, from 5% to 75% by mass.

Water, an organic solvent, a desiccant, an antioxidant, a reaction catalyst, a dispersant, an antifoaming agent, a dehydrating agent, a leveling agent, an anti-settling agent, an anti-sagging agent, an adhesive property imparting agent such as a silane coupling agent, an algae proofing agent, a fungicide, a preservative, a ultraviolet absorber, a light stabilizer and the like may be appropriately compounded in the coating composition of the present invention, if necessary, in addition to the resin component and the pigment component. The coating composition of the present invention can be prepared by mixing various kinds of components which are appropriately selected if necessary.

As the organic solvent, an aliphatic hydrocarbon-based solvent and an aromatic hydrocarbon-based solvent having a high boiling point are preferable in the preparation of a weak solvent-based coating material. As specific examples thereof, aliphatic or aromatic hydrocarbons having relatively low dissolving power such as VM & P naphtha, mineral spirits, solvent kerosene, aromatic naphtha, and solvent naphtha; and aliphatic hydrocarbons such as n-butane, n-hexane, n-octane, isononane, n-decane, n-dodecane, cyclopentane, cyclohexane, and cyclobutane are used.

Examples of commercially available products thereof may include "Swasol 1000", "Swasol 1500", and "Swasol 1800" (all are trade names, manufactured by MARUZEN PETROCHEMICAL CO., LTD.), "Mineral Spirits A", "T-SOL100", "T-SOL150", "T-SOL-3040", and "T-SOL AN45" (all are trade names, manufactured by JXTG Nippon Oil & Energy Corporation), "EssoNaphtha No. 6", "EXOL D30" and "PEGASOL 3040" (all are trade names, manufactured by Exxon Mobil. Corporation), "IP SOLVENT", "IPSOL 100", "IPSOL 150", and "IPSOL TP" (all are trade names, manufactured by Idemitsu Kosan Co., Ltd.), and "LINEALENE 10" and "LINEALENE 12" (manufactured by Idemitsu Petrochemical Co., Ltd.), and the like.

In addition, it is also possible to compound an organic solvent in water-based coating materials in addition to water in order to enhance the film-formthg property of the coating film. Examples of such an organic solvent may include glycol ethers such as ethylene glycol mono-n-butyl ether, ethylene glycol mono-i-butyl ether, ethylene glycol mono-n-propyl ether, ethylene glycol mono-i-propyl ether, diethylene glycol mono-n-butyl ether, diethylene glycol mono-i-butyl ether, diethylene glycol mono-n-propyl ether, diethylene glyool mono-i-propyl ether, dipropylene glycol mono-n-butyl ether, dipropylene glycol mono-i-butyl ether, dipropylene glycol mono-n-propyl ether, dipropylene glyool mono-i-propyl ether, diethylene glycol diethyl ether, diethylene glycol dibutyl ether and the like, 2,2,4-trimethylpentanediol monoisobutyrate, and 2,2,4-trimethylpentanediol diisobutyrate. These may be used alone or in combination of plural kinds thereof.

As the dispersant, for example, ANTI-TERRA-U, ANTI-TERRA-U100, ANTI-TERRA-204, DISPERBYK-101, DISPERBYK-102, DISPERBYK-103, DISPERBYK-106, DISPERBYK-108, DISPERBYK-110, DISPERBYK-111, DISPERBYK-142, DISPERBYK-145, DISPERBYK-164, ANTI-TERRA-U250, DISPERBYK, DISPERBYK-102, DISPERBYK-180, DISPERBYK-184, DISPERBYK-185, DISPERBYK-187, DISPERBYK-190, DISPERBYK-191, DISPERBYK-192, DISPERBYK-193, DISPERBYK-194N, DISPERBYK-2010, DISPERBYK-2012, DISPERBYK-2015, DISPERBYK-2060, DISPERBYK-2061, DISPERBYK-2096, DISPPRBYK-2013, DISPERBYK-2055, DISPERBYK-2152, DTSPERBYK-P104, DISPERBYK-P104S, DISPERBYK-P105, DISPERBYK-9076, and DISPERBYK-9077 (manufactured by BYK Japan KR), FLOWLEN DOPA-15B, FLOWLEN DOPA-15BHFS, FLOWLEN DOPA-17HF, FLOWLEN DOPA-22, FLOWLEN DOPA-35, FLOWLEN G-600, FLOWIEN G-700, FLOWLEN G-700AMP, FLOWLEN G-700DMEA, FLOWLEN WK-13E, FLOWLEN GW-1500, and FLOWLEN G-1604 (manufactured by KYOEISHA CHEMICAL CO., LTD.), Soisperse 20000, Solsperse 27000, and Soisperse 41090 (these are manufactured by Avecia), TEGO Dispers 610, TEGO Dispers 628, TEGO Dispers 630, TEGO Dispers 655, TEGO Dispers 670, TEGO Dispers 685, TEGO Dispers 700, TEGO Dispers 715W, TEGO Dispers 740W, TEGO Dispers 750W, TEGO Dispers 755W, TEGO Dispers 757W, TEGO Dispers 760W, TEGO Dispers 761W, and TEGO Dispers 765W (manufactured by Evonik Industries AG), DISPARLON 1850, DISPARLON DA-1401, DISPARLON DA-325, DISPARLON DA-375, DISPARLON AQ-320, DISPARLON AQ-340, DISPARLON AQ-360, and DISPARLON AQ-380 (manufactured by Kusumoto Chemicals, Ltd.), SN-DISPERSANT 4215, SN-DISPERSANT 2010, and SN-DISPERSANT 5034 (manufactured by San Nopco Limited), and EFKA-1501, EFKA-4540, and EFKA-4550 (manufactured by BASF SE) can be used. As the anti-settling agent, DISPARLON 4200-20, DISPARION PF-911, DISPARLON PF-930, DISPARLON 4401-20, DISPARLON 607, DISPARLON AQ-610, DISPARLON AQ-630, DISPARLON AQ-870, and DISPARLON AQH-800 (manufactured by Kusumoto Chemicals, Ltd.) and TAIEN 7200-20, TALEN M-1021B, FLOWNON RCM-210, FLOWNON RCM-220, FLOWNON SA-300H, and FLOWNON SD-700 (manufactured by KYOEISHA CHEMICAL CO., LTD.) can be used. As the anti-sagging agent, DISPARLON 6900-20X, DISPARLON A603-20X, DISPARLON A670-20M, DISPARLON 6810-20X, DISPARLON 6820-20M, and DISPARLON 6700 (manufactured. by Kusumoto Chemicals, Ltd.), A-S-A 1250F, A-S-A T-380-20BS, and A-S-A TS-823 (manufactured by ITO OIL CHEMICALS CO., LTD.), BYK-405, BYK-410, BYK-415, BYK-420, BYK-425, BYK-430, BYK-431, TIXOGEL HT, and CLAYTON FAQ (manufactured. by BYK Japan KK), and TALEN VA-750B, TALEN BA-600, TALEN 1450, THIXOL K-130B, THIXOL K-502, THIXOL W-300, THIXOL W-310P, and THIXOL W-400LP (manufactured. by KYOEISHA CHEMTCAL CO., LTD.) can be used.

In addition, from the viewpoint of favorable coating film appearance, it is preferable to use acrylic polymer-based, polyether polymer-based, polyester polymer-based, urethane polymer-based, unsaturated carboxylic acid-based, polyester acid salt-based, and modified silicone-based dispersants and acrylic polymer-based, alkyl-modified silicone-based, polyether-modified sthcone-based, and polyester-modified silicone-based surface condoners. In addition, from the viewpoint of favorable coating workability, preferable to use acrylic polymer-based, polyether polymer-based, polyester polymer-based, urethane polymer-based, unsaturated. carboxylic acid-based, polyester acid salt-based, and. modified silicone-based dispersants and acrylic polymer-based, vinyl ether polymer-based, butadiene polymer-based, olefin polymer-based, silicone-based, and fluorine-modified silicone-based antifoaming agents.

As the surface conditioner, POLYFLOW No.36, POLYFLOW No.56, POLYFLOW No.85HF, POLYFLOW KL-400HF, POLYFLOW KL-402, POLYFLOW KL-406, POLYFLOW WS, POLYFLOW WS-314, POLYFLOW KL-100, POLYFLOW KL-401, POLYFLOW KL-403, POLYFLOW KL-404, and POLYFLOW KL-900 (manufactured by KIOEISHA CHEMICAL CO., LTD.), BYK-300, BYK-302, BYK-306, BYK-307, BYK-310, BYK-320, BYK-322, BYK-323, BYK-325, BYK-330, BYK-331, BYK-333, BYK-342, BYK-345, BYK-350, BYK-354, BYK-370, BYK-377, and BYKETOL-OK (manufactured by BYK), DISPARLON 1970, DISPARLON LF-1980, and DISPARLON LF-1982 (manufactured by Kusumoto Chemicals, Ltd.), TEGO Flow 300, TEGO Flow 370, TEGO Flow 425, TEGO Flow ATF2, TEGO Glide 100, TECO Glide 110, TEGO Glide 130, TEGO Glide 406, TEGO Glide 410, TEGO Glide 415, TEGO Glide 440, TEGO Glide 450, TEGO Glide 482, and TEGO Glide ZG400 (manufactured by Evonik Industries AG) can be used.

As the antjfoaming agent and foam suppressor, DAPPO SN-348, DAPPO SN-352, DAPPO SN-359, and DAPPO SN-368 (manufactured by San Nopco), FLOWLEN AC-202, FLOWLEN AC-262H, FLOWLEN AC-300, FLOWLEN AC-300HF, FLOWLEN AC-326F, FLOWLEN AC-901, FLOWLEN AC-901HF, FLOWLEN AC-902, FLOWLEN AC-903, FIOWLEN AC-9031IF, FLOWIEN AC-950, FLOWLEN AC-1160, FLOWLEN AC-1160HF, FLOWLEN AC-2000, FLOWLEN AC-2000HF, FLOWLEN AC-2200HF, FLOWLEN AO-82, FLOWLEN AO-98, FLOWLEN AO-108, AQUALEN 8020, AQUALEN 8021N, AQUALEN SIB-520, AQUALEN SB-630, AQUALEN HS-01, and FLOWLEN AO-5 (manufactured by KYOEISHA CHEMICAL CO., LTD.), PYK-051N, BYK-052N, BYK-055, BYK-065, BYE-077, BYK-081, BYK-088, BYK-354, BYK-1752, BYK-011, BYK-012, BYK-014, BYE-017, BYE -021, BYK-022, BYK-024, BYK-025, BYK004, BYK-093, BYK-1610, BYK-1640, BYK-1650, and BYK-1785 (manufactured by BYK), DISPARLON OX-880EF, DISPARLON OX-70, DISPARLON OX-77EF, DISPARLON OX-710, DISPARLON OX-66, DISPARLON OX-66EF, DISPARLON 1952, DISPARLON 1958, DISPARLON 1930N, and DISPARLON 1934 (manufactured by Kusumoto Chemicals, Ltd.), and TEGO Airex 910, TEGO Airex 920, TEGO Airex 931, TEGO Airex 940, TEGO Airex 950, TEGO Airex 901W, TEGO Airex 902W, TEGO Airex 904W, TEGO Foamex 800, TEGO Foamex 815N, TEGO Foamex 840, TEGO Foamex 1488, TEGO Foamex 1495, and TEGO Foamex 8030 (manufactured by Evonik Industries AG) can be used.

In addition, from. the viewpoint of improving the adhesive property of the coating film to the object to be coated after drying, it is preferable to use a silane coupling agent having a functional group such as an amino group, a vinyl group, an acryl group, a methacryl group, an allyl group, a ureido group, an isocyanate group, an isocyanurate group, a styryl group, an epoxy group, a mercapto group or the like, and it is more preferable to use a silane coupling agent having an amino group, an epoxy group, a mercapto group among these. As the silane coupling agent, for example, Z-6610, Z-6011, Z-6020, Z-6094, Z-6040, Z-6043, Z-6044, Z-6062, Z-6883, Z-6032, Z-6075, Z-6519, Z-6825, Z-6030, Z-6033, and Z-6062 (all are trade names, manufactured by Dow Corning Toray Co., Ltd.), KBM-1003, KBE-1003, KBM-1403, KBM-303, KBM-402, KBM-403, KBE-402, KBE-403, KBM-502, KBE-502, KEM-503, KBE-503, KBM-5103, KBM-602, KBM-603, KEM-903, KBE-903, KBE-9103, KBM-573, KBM-9659, KBE-585, KBM-802, KBM-803, and KBE-9007 (all are trade names, manufactured by Shin-Etsu Chemical Co., Ltd.), and GENIOSIL GF91, GENIOSIL GF95, GENIOSIL GF80, and GENIOSIL GF82 (all are trade names, manufactured by Wacker Asandkasei Silicone Co., Ltd.) are commercially available.

In addition, as the properties of coating material, the appearance, anticorrosion property, workability and the like can be adjusted. and. improved by adjusting various physical property values of the coating material, various physical property values of the coating material before drying at the time of coating, and various physical property values of the cured coating film.

Examples of the physical property values may include the viscosity of coating material, the density of coating material, the Ti value, PVC, the pencil hardness, the tensile strength, the tensile modulus of elasticity, and elongation percentage.

Preferred ranges of various physical property values are specifically mentioned as follows. It is desirable that the viscosity of coating material is from 1 to 6 Pa·s (23° C.), the density of coating material is from 1.2 to 1.6 g/mL (23° C.). the Ti value is from 3.0 to 6.0, PVC is from 25% to 40%, the pencil hardness is from 2B to 3H, the tensile strength is from 5.0 to 20.0 N/mm$^2$, the tensile modulus of elasticity is from 500 to 1,500 N/mm$^2$, and the elongation percentage is from 0.1% to 5.0%.

The coating means of the coating composition of the present invention is not particularly limited, and known coating means, for example, spray coating, roller coating, brush coating, trowel coating, spatula coating or the like can be used.

<Coating Film>

Next, the coating film of the present invention will be described in detail. The coating film of the present invention is a coating film comprising a resin and a pigment, in which the linear expansion coefficient at a temperature equal to or less than the glass transition temperature of the coating film is $3.2 \times 10^{-5}$/K or less. According to the coating film of the present invention, it is possible to greatly prevent peeling off of the coating film by setting the linear expansion coefficient at a temperature equal to or less than the glass transition temperature of the coating film to $3.2 \times 10^{-5}$/K or less.

The coating film of the present invention exhibits excellent. durability in this manner, and thus it is suitable for repair and preferably used, for example, for repair of structures built and constructed outdoors, particularly for repair of steel structures such as bridges. In addition, the peeling off preventing effect of the coating film of the present invention is also greater as the film thickness is larger, and thus the film thickness of the coating film of the present invention increases when repair is repeatedly conducted using the coating film of the present invention and the peeling off preventing effect is also enhanced every time repair is repeatedly conducted. In addition, at is preferable to adapt the coating film as a coating film for thick film from the viewpoint of peeling off prevention, and the coating film can be formed on the old coating film without removing the old coating film when repair is repeatedly conducted.

In addition, the coating film of the present invention is a coating film which can be formed from the coating composition of the present invention described above, and the resin and pigment contained in the coating film of the present invention and the compounding agents which can be contained therein if necessary are as explained in the description on the coating composition of the present invention described above. In addition, the glass transition temperature and linear expansion coefficient of the coating film of the present invention can also be measured in the same manner as the glass transition temperature and linear expansion coefficient of the nonvolatile components in the coating composition of the present invention described above.

The linear expansion coefficient $\alpha_1$ of the coating film of the present invention is preferably $1.5 \times 10^{-5}$/K or more and still more preferably $1.8 \times 10^{-5}$/K or more for the same reason. as that for the linear expansion coefficient $\alpha_1$ of the nonvolatile components in the coating composition of the present invention described above. In addition, the linear expansion coefficient of the coating film of the present invention is preferably less than $3.2 \times 10^{-5}$/K, still more preferably $2.5 \times 10^5$/K or less, and yet still more preferably $2.0 \times 10^{-5}$/K or less for the same reason as that for the linear expansion coefficient $\alpha_1$ of the nonvolatile components in the coating composition of the present invention described above.

In addition, the linear expansion coefficient $\alpha_2$ of the coating film of the present invention at a temperature equal to or more than the glass transition temperature of the coating film is preferably $3.0 \times 10^{-5}$K or less and more preferably $2.0 \times 10^{-5}$/K or less for the same reason as that for the linear expansion coefficient $\alpha_2$ of the nonvolatile components in the coating composition of the present invention described above. In addition, the linear expansion coefficient $\alpha_2$ of the coating film of the present invention is preferably $1.0 \times 10^{-5}$/K or more for the same reason as that for the linear expansion coefficient $\alpha_2$ of the nonvolatile components in the coating composition of the present invention described above.

The total content of resin and pigment in the coating film of the present invention is preferably 95% or more by mass and still more preferably from 98% to 100% by mass. It is easy to adjust the linear expansion coefficient of the coating film when the total content of resin and pigment is 95% or more by mass. In addition, it is desirable that the content of resin in the coating film is 5% or more by mass from the viewpoint of forming a coating film.

In addition, in the coating film of the present invention, the film thickness to be obtained by one time of coating step is preferably in a range of from 25 to 500 µm. According to the coating film of the present invention, the peeling off preventing effect is greater as the film thickness is larger and thus a coating film having a thickness more than 500 µm through repeated coating step is also suitable.

<Coating Method>

Next, the coating method of the present invention will be described in detail. The coating method of the present invention comprises a step of coating an object to be coated with a coating composition comprising a resin component and a pigment to form a coating film having a linear expansion coefficient of $3.2 \times 10^{-5}$/K or less at a temperature equal to or less than a glass transition temperature of the coating film. According to the coating method of the present invention, it is possible to greatly prevent peeling off of the coating film by forming a coating film having a linear expansion coefficient of $3.2 \times 10^{-5}$/K or less at a temperature equal to or less than the glass transition temperature of the coating film.

The coating film formed by the coating method of the present invention exhibits excellent durability in this manner, and thus it is suitable for repair-coating and preferably used, for example, for repair of structures built and constructed outdoors, particularly for repair of steel structures such as bridges. Moreover, it is preferable that the coating composition to be used in the coating method of the present invention is an ordinary-temperature-drying type coating composition or a two-liquid-reaction type coating composition from the viewpoint of being adapted to repair of outdoor structures.

In addition, the peeling off preventing effect of the coating film formed by the coating method of the present invention is also enhanced as the film thickness of the coating film is larger, and thus the coating method of the present invention is also excellent for thick film coating, and particularly, coating can be suitably conducted on the old coating film by the coating method without removing the old coating film when repair is repeatedly conducted. In a case in which repair-coating is repeatedly conducted in this manner, a remarkable peeling off preventing effect can be exerted when a coating film having a film thickness of, for example, from 25 to 150 µm is formed by one time of repair-coating or when a thick film is formed so that the film thickness of the entire coating film including the old coating film exceeds 500 µm by repeatedly conducting repair-coating on the old coating film. Hence, the (repair) coating method of the present invention is preferably used for recoating repair.

The coating composition to be used in the coating method of the present invention is a coating composition comprising a resin component and a pigment, but the linear expansion coefficient at a temperature equal to or less than the glass transition temperature of the coating film to be formed after coating is $3.2 \times 10^{-5}$/K or less, and thus the coating composition of the present invention described above can be used. Hence, the resin component and pigment contained in the coating composition to be used in the coating method of the present invention and the compounding agents which can be contained therein if necessary are as explained in the description on the coating composition of the present invention described above.

The coating film formed by the coating method of the present invention is a coating film having a linear expansion coefficient of $3.2 \times 10^{-5}$/K or less at a temperature equal to or less than the glass transition temperature of the coating film and is as explained in the description on the coating film of the present invention above. Hence, the linear expansion coefficient $\alpha_1$ of the coating film formed by the coating method of the present invention at a temperature equal to or less than the glass transition temperature of the coating film is preferably $1.5 \times 10^{-5}$/K or more and more preferably $1.8 \times 10^{-5}$/K or more and the linear expansion coefficient $\alpha_1$ is preferably less than $3.2 \times 10^{-5}$/K preferably $2.5 \times 10^{-5}$/K or less, and still more preferably $2.0 \times 10^{-5}$/K or less.

In addition, the linear expansion coefficient $\alpha_2$ of the coating film formed by the coating method of the present invention at a temperature equal to or more than the glass transition temperature of the coating film is preferably $3.0 \times 10^{-5}$/K or less and more preferably $2.0 \times 10^{-5}$/K or less and the linear expansion coefficient $\alpha_2$ is preferably $1.0 \times 10^{-5}$/K or more as explained in the description on the coating film of the present invention above.

In the coating method of the present invention, the object to be coated is not particularly limited, but the coating film formed by the coating method of the present invention exhibits excellent durability and is suitable for repair, and thus the coating method of the present invention is useful in a case in which the object to be coated is structures (buildings and nonbuilding structures) which are built/constructed outdoors. Incidentally, in the present invention, a building means a structure built for a purpose that a human being lives or stays therein, and examples thereof may include houses, buildings, and factories. A nonbuilding structure means a structure constructed for purposes other than the purpose that a human being lives or stays therein, and examples thereof may include bridges, tanks, plant pipes, and chimneys. In particular, the coating method of the present invention is useful in a case in which the object to be coated is a steel structure such as a bridge.

In the coating method of the present invention, the coating means is not particularly limited, and known coating means, for example, spray coating, roller coating, brush coating, trowel coating, and spatula coating or the like can be used.

In the coating method of the present invention, the means for drying and curing the coating film is not particularly limited, and it is appropriately selected depending on the kind of the coating composition to be used. For example, drying by heating or curing by heating, ultraviolet irradiation or the like may be conducted, or special drying and curing means may not be employed in the case of a coating composition (for example, a two-liquid type coating composition) in which the hardening reaction spontaneously proceeds and a coating composition (for example, a volatile solvent-based coating composition) which can be naturally dried.

In the coating method of the present invention, it is preferable that the step of forming a coating film having a linear expansion coefficient $\alpha_1$ in the range specified above (hereinafter also referred to as coating film forming step) is repeatedly conducted every time repair-coating is conducted. Incidentally, removal work such as scraping work may be conducted for the coating film (old coating film) already formed on the object to be coated when conducting the coating film forming step and the portion to be subjected to an anticorrosion treatment such as zinc plating treatment. However, according to the coating method of the present invention, the peeling off preventing effect of the coating film to be formed is also greater as the film thickness of the coating film is larger and it is thus possible to carry out the coating film forming step in a state in which the old coating film and the portion to be subjected to an anticorrosion treatment remain. Incidentally, it is preferable that the old coating film is also a coating film formed by the coating film forming step.

It is preferable that the coating film to be formed in the coating film forming step has a dried film thickness of from 25 to 500 µm and preferably from 25 to 150 µm by one time of coating. The coating film formed in the coating film forming step has a greater peeling off preventing effect as the film thickness thereof is larger, and thus a remarkable peeling off preventing effect can be exerted by repeatedly conducting the coating film forming step every time repair is conducted even when the old coating film is a coating film which is extremely thick so that the film thickness thereof exceeds 500 µm and likely to peel off.

EXAMPLES

Hereinafter, the present invention will be described in more detail with reference to Examples, but the present invention is not limited to the following Examples at all.

The formulation of the epoxy resin coating compositions of Examples 1 to 9 (Example-1 to Example-9) and Comparative Examples 1 to 8 (Comparative-1 to Comparative-8) are presented in Table 2. For the formulation, the "thick film type modified epoxy resin coating material for steel structure, undercoat standard coating material" described in Reference Literature 3 as the standard formulation was designated as Comparative Example 1, and the talc contained therein was replaced with various target pigments.

Reference Literature 3: Guidelines for coating design of steel structures 2006 (Foundation) Railway Technical Research Institute.

Each epoxy resin coating composition was produced by the following method. The main agent was produced by mixing the respective components except glass flakes and mica according to the compounding ratio in Table 2 and then sufficiently dispersing the mixture using a desk sand mill under glass beads filling. For the coating material containing glass flakes and mica, glass flakes and mica were added to the base sufficiently dispersed using a desk sand mill according to the compounding ratio in Table 2 and uniformly stirred and mixed using a disperser to produce the main agent.

Each epoxy resin coating composition was produced by mixing the main agent thus obtained with the curing agent at the compounding ratio presented in Table 2.

TABLE 2

| | | | Example-1 | Example-2 | Example-3 | Example-4 | Example-5 | Example-6 | Example-7 | Example-8 | Example-9 | Comparative-1 |
|---|---|---|---|---|---|---|---|---|---|---|---|---|
| Formulation | Amount of target pigment in nonvolatile component (% by mass) | | 35.4 | 43.7 | 35.4 | 28.7 | 33.7 | 67.6 | 60.8 | 35.2 | 35.2 | 31.8 |
| | Main agent | JER1001X75 (Note 1) | 28.3 | 24.8 | 28.3 | 30.9 | 29.5 | 14.9 | 17.5 | | | 29.7 |
| | | JER168V70 (Note 2) | | | | | | | | 37.4 | | |
| | | JER828 (Note 3) | | | | | | | | | 24.8 | |
| | | NIKANOL LLL (Note 4) | 4.7 | 4.1 | 4.7 | 5.2 | 4.9 | 2.4 | 2.9 | 4.8 | 4.8 | 5.0 |
| | | K-WHITE#82 (Note 5) | 4.7 | 4.1 | 4.7 | 5.2 | 4.9 | 2.4 | 2.9 | 4.8 | 4.8 | 5.0 |
| | | CROWN TALC 3S (Note 6) | | | | | | | | | | 29.7 |
| | | RFC-015 (Note 7) | | | | | | 65.0 | | | | |
| | | RFC-160 (Note 8) | | 41.3 | 33.0 | | 31.0 | | | 33.3 | 33.3 | |
| | | RFC-600 (Note 9) | 33.0 | | | 26.8 | | | | | | |
| | | FB-20D/5D = 9/1 (Note 10) | | | | | | | 58.5 | | | |
| | | Mica B-82 (Note 11) | | | | | | | | | | |
| | | BENGALA130R (Note 12) | 9.4 | 8.3 | 9.4 | 10.3 | 9.7 | 4.9 | 5.8 | 9.5 | 9.5 | 9.9 |
| | | DISPARLON D4200-20X (Note 13) | 0.9 | 0.8 | 0.9 | 1.0 | 1.0 | 0.5 | 0.6 | 1.0 | 1.0 | 1.0 |
| | | DISPARLON OX-66 (Note 14) | 0.1 | 0.1 | 0.1 | 0.1 | 0.1 | 0.1 | 0.1 | 0.1 | 0.1 | 0.1 |
| | | KBM403 (Note 15) | 0.9 | 0.8 | 0.9 | 1.0 | 1.0 | 0.5 | 1.0 | 1.0 | 1.0 | 1.0 |
| | | Xylene | 9.4 | 8.2 | 9.4 | 10.2 | 9.3 | 5.0 | 5.8 | | 10.5 | 9.7 |
| | | Methyl isobutyl ketone | 8.6 | 7.5 | 8.6 | 9.3 | 8.6 | 4.3 | 5.3 | | 10.2 | 8.9 |
| | | Mineral spirits | | | | | | | | 8.1 | | |
| | Sum of main agent (parts by mass) | | 100.0 | 100.0 | 100.0 | 100.0 | 100.0 | 100.0 | 100.4 | 100.0 | 100.0 | 100.0 |
| | Curing agent | SUNMIDE 150-65 (Note 16) | 100.0 | 100.0 | 100.0 | 100.0 | 100.0 | 100.0 | 100.0 | | | 100.0 |
| | | JERCURE XD #639 (Note 17) | | | | | | | | 100.0 | | |
| | | ANCAMIDE 350A (Note 18) | | | | | | | | | 100.0 | |
| | Sum of curing agent (parts by mass) | | 100.0 | 100.0 | 100.0 | 100.0 | 100.0 | 100.0 | 100.0 | 100.0 | 100.0 | 100.0 |
| | Mixing ratio | Main agent | 77.0 | 79.0 | 77.0 | 75.0 | 78.0 | 87.0 | 84.0 | 87.0 | 86.0 | 76.0 |
| | | Curing agent | 23.0 | 21.0 | 23.0 | 25.0 | 22.0 | 13.0 | 16.0 | 13.0 | 14.0 | 24.0 |
| | Nonvolatile component in mixed coating material | | 71.9 | 74.6 | 71.9 | 70.2 | 71.7 | 83.6 | 80.8 | 82.2 | 81.3 | 71.0 |

TABLE 2-continued

| Test results | Linear expansion coefficient ($\alpha_1$) × $10^{-5}$/K | | 2.0 | 2.5 | 3.0 | 3.2 | 3.2 | 3.2 | 32 | 3.0 | 3.0 | 5.5 |
|---|---|---|---|---|---|---|---|---|---|---|---|---|
| | Linear expansion coefficient ($\alpha_2$) × $10^{-5}$/K | | 1.0 | 1.9 | 2.4 | 1.7 | 2.7 | 7.0 | 6.1 | 2.4 | 2.7 | 11.8 |
| | Heat cycle peel test | 60 μm | 5 | 5-4 | 4 | 4 | 4-3 | 3 | 3 | 4 | 4 | 1 |
| | (50 cycles) | 300 μm | 5 | 5 | 5-4 | 5 | 4 | 4-3 | 4-3 | 5-4 | 5-4 | 0 |

| | | | Comparative-2 | Comparative-3 | Comparative-4 | Comparative-5 | Comparative-6 | Comparative-7 | Comparative-8 |
|---|---|---|---|---|---|---|---|---|---|
| Formulation | Amount of target pigment in nonvolatile component (% by mass) | | 31.6 | 38.5 | 23.7 | 46.2 | 43.7 | 13.5 | 23.7 |
| | Main agent | JER1001X75 (Note 1) | | 27.0 | 33.0 | 23.8 | 24.8 | 37.0 | 33.0 |
| | | JER168V70 (Note 2) | 39.3 | | | | | | |
| | | JER828 (Note 3) | | | | | | | |
| | | NIKANOL LLL (Note 4) | 5.0 | 4.5 | 5.5 | 4.0 | 4.1 | 6.2 | 5.5 |
| | | K-WHITE#82 (Note 5) | 5.0 | 4.5 | 5.5 | 4.0 | 4.1 | 6.2 | 5.5 |
| | | CROWN TALC 3S (Note 6) | 30.0 | | | | 41.3 | | |
| | | RFC-015 (Note 7) | | 36.0 | | | | | |
| | | RFC-160 (Note 8) | | | 22.0 | | | | |
| | | RFC-600 (Note 9) | | | | | | | |
| | | FB-20D/5D = 9/1 (Note 10) | | | | 43.7 | | | |
| | | Mica B-82 (Note 11) | | | | | | 12.3 | 22.0 |
| | | BENGALA130R (Note 12) | 10.0 | 9.0 | 11.0 | 7.9 | 8.3 | 12.3 | 11.0 |
| | | DISPARLON D4200-20X (Note 13) | 1.0 | 0.9 | 1.1 | 0.8 | 0.8 | 1.2 | 1.1 |
| | | DISPARLON OX-66 (Note 14) | 0.1 | 0.1 | 0.1 | 0.1 | 0.1 | 0.1 | 0.1 |
| | | KBM403 (Note 15) | 1.0 | 0.9 | 1.1 | 0.8 | 0.8 | 1.2 | 1.1 |
| | | Xylene | | 9.0 | 10.8 | 7.9 | 8.3 | 12.3 | 10.8 |
| | | Methyl isobutyl ketone | | 8.1 | 9.9 | 7.0 | 7.4 | 11.2 | 9.9 |
| | | Mineral spirits | 8.6 | | | | | | |
| | Sum of main agent (parts by mass) | | 100.0 | 100.0 | 100.0 | 100.0 | 100.0 | 100.0 | 100.0 |
| | Curing agent | SUNMIDE 150-65 (Note 16) | | 100.0 | 100.0 | 100.0 | 100.0 | 100.0 | 100.0 |
| | | JERCURE XD #639 (Note 17) | 100.0 | | | | | | |
| | | ANCAMIDE 350A (Note 18) | | | | | | | |
| | Sum of curing agent (parts by mass) | | 100.0 | 100.0 | 100.0 | 100.0 | 100.0 | 100.0 | 100.0 |
| | Mixing ratio | Main agent | 86.0 | 78.0 | 74.0 | 80.0 | 79.0 | 72.0 | 74.0 |
| | | Curing agent | 14.0 | 22.0 | 26.0 | 20.0 | 21.0 | 28.0 | 26.0 |
| | Nonvolatile component in mixed coating material | | 81.5 | 72.9 | 68.6 | 75.6 | 74.6 | 65.7 | 68.6 |
| Test results | Linear expansion coefficient ($\alpha_1$) × $10^{-5}$/K | | 5.4 | 5.5 | 4.7 | 4.7 | 4.4 | 5.2 | 3.6 |
| | Linear expansion coefficient ($\alpha_2$) × $10^{-5}$/K | | 11.8 | 13.4 | 6.0 | 11.5 | 9.9 | 10.2 | 4.2 |
| | Heat cycle peel test | 60 μm | 1 | 1 | 1 | 1 | 1 | 1 | 2 |
| | (50 cycles) | 300 μm | 0 | 0 | 1-0 | 1-0 | 1-0 | 0 | 2-1 |

(Note 1) JER 1001X75: trade name, bisphenol A type liquid epoxy resin manufactured by Mitsubishi Chemical Corporation, nonvolatile components: by mass, epoxy equivalent: 450 to 500 g/eq (Note 2) JER 168V70: trade name, modified bisphenol A type liquid epoxy resin manufactured by Mitsubishi Chemical Corporation, nonvolatile components: 70 by mass, epoxy equivalent: 420 to 480 g/eq (Note JER 828: trade name, bisphenol A type liquid epoxy resin manufactured by Mitsubishi Chemical Corporation, nonvolatile components: 100% by mass, epoxy equivalent 184 to 194 g/eq (Note 4) NIKANOL LLL: trade name, xylene resin manufactured by Fudow Company Limited (Note 5) K-WHITE #82: trade name, condensed aluminum phosphate manufactured by Tayca Corporation, average particle diameter: 3.5 μm (Note 6) CROWN TALC 38: trade name, talc manufactured by Matsumura Sangyo Co., Ltd., average particle diameter: 11.9 μm (Note 7) RFC-015: trade name, glass flake pigment manufactured by Nippon Sheet Glass Co., Ltd., small particle diameter (average particle diameter: 15 μm)

(Note 8) RCF-160: trade name, glass flake pigment manufactured by Nippon Sheet. Glass Co., Ltd., middle particle diameter (average particle diameter: 160 μm)

(Note 9) RCF-600: trade name, glass flake pigment manufactured by Nippon Sheet Glass Co., Ltd., large particle diameter (average particle diameter: 600 μm)

(Note 10) FB-20D/5D: trade name, spherical fused silica manufactured. by Denka Company Limited, FB-20D (average particle diameter: 22.5 μm), FB-5D (average particle diameter: 4.9 μm), mixed at FB-20D/5D=9/1 (mass ratio)

(Note 11) Mica B-82: trade name, mica manufactured by Yamaguchi Mica Corporation, large particle diameter (average particle diameter: 180 μm)

(Note 12) BENGALA 130R: trade name, iron oxide manufactured by TODA KOGYO CORP., average particle diameter: 0.2 μm (Note 13) DISPARLON D4200-20X: trade name, dispersant manufactured by Kusumoto Chemicals, Ltd.

(Note 14) DISPARLON OX-66: trade name, antifoaming agent manufactured by Kusumoto Chemicals, Ltd.

(Note 15) KBM 403: trade name, silane coupling agent. manufactured by Shin-Etsu Chemical Co., Ltd.

(Note 16) SUNMIDE 150-65: trade name, modified aliphatic polyamidoamine manufactured by Air Products and Chemicals, Inc., nonvolatile components: 65% by mass, amine value: 62 mg KOH/g (Note 17) JERCURE XD #639: trade name, modified aliphatic polvamidoamine manufactured by Mitsubishi Chemical Corporation, nonvolatile components: 99% by mass, amine value: 220 mg KOH/g (Note 18) ANCAMIDE 350A: trade name, polyamidoamine manufactured by Air Products and Chemicals, Inc., nonvolatile components: 100% by mass, amine value: 380 mg KOH/g The respective epoxy resin coating compositions obtained in Examples 1 to 9 and Comparative Examples 1 to 8 were subjected to the following tests.

(1) Measurement of linear expansion coefficient ($\alpha_1$ and $\alpha_2$)

The linear expansion coefficients ($\alpha_1$ and $\alpha_2$) of the respective epoxy resin coating compositions obtained in Examples 1 to 9 and Comparative Examples 1 to 8 were measured by the method described in the "method for measuring linear expansion coefficient". With regard to the method for producing the coating film, specifically, the coating material to be measured was applied onto a tin plate (0.3 mm×75 mm×150 mm) having a clean surface using a brush and cured at 23° C. This operation was conducted one time a day until the dried film thickness reached about 6 mm or more. At that time, the brush coating direction was crossed every time. The coating film having a dried film thickness of about 6 mm or more was cured for one day and one night in a constant temperature bath maintained at 50° C. together with the tin plate, thereby preparing a coating film for measurement. The measurement results are presented in Table 2.

(2) Heat Cycle Peel Test

The heat cycle attachment test was conducted by the following method. The results are presented in Table 2.

A clear coating liquid prepared by dissolving 23 parts by mass of vinyl chloride resin powder (SOLBIN C: copolymer of vinyl chloride/vinyl acetate=87/13 (mass ratio), manufactured by Nisshin Chemical Co., Ltd.) in 77 parts by mass of methyl isobutyl ketone in advance applied onto a polished steel sheet [JIS G 3141 (SPCC to SD) cold roiled steel sheet, 3.2 mm×70 mm×150 mm] of which the surface is degreased with a solvent for the first time in an application amount of 95 g/m² using a brush and cured at 23° C. for 3 hours. Subsequently, the clear coating liquid was applied onto the polished steel sheet for the second time in an application amount of 143 g/m² using a brush and cured at 23° C. for one day and one night.

A weak solvent-based modified epoxy resin coating material for undercoat (EPO-OL SMILE: manufactured by DAI NIPPON TORYO CO., LTD.) in which the solvent in the composition is a weak solvent is applied onto the vinyl chloride coating film one time in an application amount of 130 g/m² using a brush so that the vinyl chloride film applied is not affected by the solvent in the test coating material. The edges are also coated so as to prevent the influence of solvent at the edges of the test piece. Curing is conducted at 23° C. for one day and one night, then heating and curing is conducted at 50° C. for 15 hours, and cooling is conducted at 23° C.

Each of the epoxy resin coating compositions obtained in Examples 1 to 9 and Comparative Examples 1 to 8 was applied onto the cooled test piece so as to have a film thickness prescribed in Table 2. In a case in which the film thickness does not reach the regulated film thickness by one time, curing is conducted at 23° C. for one day and one night, and overcoating is conducted. Coating was conducted using a brush, and the theoretical application amount determined by the following equation was used as the application amount required for the prescribed film thickness.

$$t = \frac{m}{a} \times \left[\frac{1}{dt} - \frac{ws}{100 \times ds}\right] \times 1000 \qquad \text{[Math. 4]}$$

t: prescribed coating film thickness (μm)
m: theoretical application amount (Kg)
a: coated area (m²)
dt: density of coating material
ds: density of volatile component
ws: weight of volatile component (%)

Each epoxy resin coating composition was applied to have the prescribed film thickness and then cured at 23° C. for 2 days, and a cut damage in a # pattern (square with 20 mm on one side and 10 mm×10 mm at the center portion) reaching the base material (steel plate surface) was made at two places of the upper and lower center portions of the test piece using a P cutter. Thereafter, curing is further conducted at 23° C. for 3 days.

The test piece which has been cured is subjected to a heat cycle peel test. The test piece is placed in a constant temperature bath set at 50° C. and held for 2 hours. Thereafter, the test piece is taken out from the constant temperature bath, left to stand at 23° C. for 1 hour, and held in a low temperature bath at −30° C. for 2 hours. Thereafter, the test piece is taken out from the low temperature bath and left to stand at 23° C. for 1 hour. This cycle is taken as one cycle and repeated. The test piece is held under a condition of −30° C. at night and on holidays.

The evaluation in the heat cycle peel test is conducted by observing the cracking, peeling off, blistering of coating film (collectively referred to as defects of coating film) from the site at which cut damage in a # pattern is made, and the evaluation points are granted based on FIG. 1. The evaluation point is granted as, for example, "4 to 3" in a state in which the defects of coating film are between the reference figures. The degree of defects of coating film from the cut damage for each evaluation point is as follows.

Evaluation point 5: There is no change at all.
Evaluation point 4: Widths of cracking, peeling off, blistering of coating film from cut damage in # pattern is less than 1 mm.
Evaluation point 3: Widths of cracking, peeling off, blistering of coating film from cut damage in # pattern is less than 2 mm
Evaluation point 2: Widths of cracking, peeling off, blistering of coating film from cut damage in # pattern is less than 4 mm
Evaluation point 1: Widths of cracking, peeling off, blistering of coating film from cut damage in # pattern is less than 10 mm
Evaluation point 0: Widths of cracking, peeling off, blistering of coating film from cut damage in # pattern is 10 mm or more The coating film has the quality with the durability intended by the present invention when the evaluation point is 3 or more after 50 cycles of heat cycle test has been conducted.

(Discussion)

From the results in Table 2, the effects of the present invention will be discussed below.

First, the contents of the coating materials produced in Examples 1 to 9 and Comparative Examples 1 to 8 will be described.

Comparative Example 1 is a general strong solvent-based modified epoxy coating material, Comparative Example 2 is a weak solvent-based modified epoxy coating material, and they are coating materials in which the linear expansion coefficient $\alpha_1$ is set to about $5.5\times10^{-5}$/K.

Comparative Example 3 is a coating material in which glass flakes having a relatively small average particle diameter (hereinafter abbreviated as small glass flakes) are compounded instead of talc to be generally compounded in the modified epoxy coating material of Comparative Example 1 and the linear expansion coefficient $\alpha_1$ is set to about $5.5\times10^{-5}$/K.

Comparative Example 4 is a coating material in which glass flakes having a relatively large average particle diameter (hereinafter abbreviated as middle glass flakes) are compounded instead of the small glass flakes of Comparative Example 3 and the linear expansion coefficient is set to about $4.5\times10^{-5}$/K.

Comparative Example 5 is a coating material is which spherical silica is compounded instead of the small glass flakes of Comparative Example 4 and the linear expansion coefficient $\alpha_1$ is set to about $4.5\times10^{-5}$/K.

Comparative Example 6 is a coating material in which the compounding amount of talc of Comparative Example 1 is increased and the linear expansion coefficient $\alpha_1$ is set to about $4.5\times10^{-5}$/K.

Comparative Example 7 is a coating material in which mica having a large particle diameter (hereinafter abbreviated as large mica) is compounded instead of the talc of Comparative Example 1 and the linear expansion coefficient e is set to about $5.5\times10^{-5}$/K.

Comparative Example 8 is a coating material in which the compounding amount of mica is increased to be more than in Comparative Example 7 and the linear expansion coefficient $\alpha_1$ is set to about $3.5\times10^{-5}$/K.

Meanwhile, Example 1 is a coating material in which the compounding amount of glass flakes having a large average particle diameter (hereinafter abbreviated as large glass flakes) is increased and the linear expansion coefficient $\alpha_1$ is set to about $2.0\times10^{-5}$/K or less.

Example 2 is a coating material in which the compounding amount of the middle glass flakes of Comparative Example 4 is increased and the linear expansion coefficient cc is set to about $2.5\times10^{-5}$/K or less.

Example 3 is a coating material in which the compounding amount of the middle glass flakes of Example is further decreased and the linear expansion coefficient $\alpha_1$ is set to about $3.0\times10^{-5}$/K or less.

Example 4 is a coating material in which the compounding amount of the large glass flakes of Example 1 is decreased and the linear expansion coefficient $\alpha_1$ is set to about $3.2\times10^{-5}$/K or less.

Example 5 is a coating material in which the compounding amount, of the middle glass flakes of Example 3 is further decreased and the linear expansion coefficient $\alpha_1$ is set to about $3.2\times10^{-5}$/K or less.

Example 6 is a coating material in which the compounding amount of the small glass flakes of Comparative Example 3 is greatly increased and the linear expansion coefficient $\alpha_1$ is set to about $3.2\times10^{5}$/K or less.

Example 7 is a coating material in which the compounding amount of the spherical silica of Comparative Example 5 is greatly increased and the linear expansion coefficient $\alpha_1$ set to about $3.2\times10^{-5}$/K or less.

Example 8 is a coating material in which the formulation system of the weak solvent-based modified epoxy coating material of Comparative Example 2 is used, the middle glass flakes are compounded instead of talc, and the linear expansion coefficient $\alpha_1$ is set to about $3.0\times10^{-5}$/K or less.

Example 9 is a coating material in which a formulation system of a pure epoxy coating material, which is inferior to the strong solvent-based modified epoxy coating material used in Example 2 in flexibility, is used and the linear expansion coefficient $\alpha_1$ is set to about $3.0\times10^{-5}$/K or less.

From the results of 50 cycles of heat cycle test conducted using the coating materials having the formulation designed as described above, the following can be said.

In Comparative Examples 1 to 8 in which the linear expansion coefficient $\alpha_1$ is larger than $3.2\times10^{-5}$/K, as conventionally known, the test pieces which are coated by 300 μm and thus have a thicker film are more likely to peel off than the test pieces coated by 60 μm. However, in Examples 1 to 9 of the present invention in which the linear expansion coefficient $\alpha_1$ is $3.2\times10^{-5}$/K or less, the test pieces which are coated by 300 μm and thus have a thicker film more hardly peel off than the test pieces coated by 60 μm. From this fact, a result that the peeling property of coating film is rather improved as the coating material is applied to form a thicker coating film by setting the linear expansion coefficient $\alpha_1$ to $3.2\times10^{-5}$/K or less is obtained and this result has been unknown so far.

Next, when comparing Examples 2 to 4 with one another, the linear expansion coefficient $\alpha_1$ is smaller when a more amount of pigment is compounded in the case of compounding the same kind of pigment, and the coating film tends to more hardly peel off as the linear expansion coefficient $\alpha_1$ is smaller. In addition, when comparing Examples 1 and 3 and Comparative Example 3 with one another, the compounding amounts of glass flake pigments are similar to one another, but there is a difference in the value of linear expansion coefficient a, and as a result, a remarkable difference is also seen in the results of the peel test. The glass flakes are a scaly anisotropic material, and thus the aspect ratio thereof is larger as the average particle diameter thereof is larger, and the linear expansion coefficient $\alpha_1$ can be lowered by compounding a smaller amount of pigment as the pigment has a larger aspect ratio. The tendency that the coating film more hardly peels off as the linear expansion coefficient $\alpha_1$ is smaller in the case of the same kind of pigment can also be said in the comparison between Comparative Example 1 and Comparative Example 6 and between Comparative Example 7 and Comparative Example 8.

When comparing Examples 5 to 7 and Example 9 with one another, these are all in the same formulation design system of strong solvent-based modified epoxy coating materials, however, it can be seen that the ease of peeling off is also almost equal when the linear expansion coefficients $\alpha_1$ are equal with one another even if the kinds of pigments are different. This result that the ease of peeling off is equal when the linear expansion coefficients of are equal with one another even though the kinds of pigments are different from one another can also be said in the comparison between Comparative Example 1 and Comparative Example 3 and between Comparative Examples 5 to 7 and Example 9.

However, in the comparison between Example 5 and Example 6 and Example 7, the linear expansion coefficients $\alpha_1$ are all $3.2\times10^{-5}$, but the linear expansion coefficients $\alpha_2$ of Example 6 and Example 7 are as large as $6.0\times10^{-5}$ or more and the linear expansion coefficient $\alpha_2$ of Example 5 is as small as $2.7\times10^{-5}$, and the coating film of Example 5 in which the linear expansion coefficient $\alpha_2$ is smaller than $3.0×10^{-5}$ tends to more hardly peel off. In the comparison between Example 4 and Example 5 as well, $α_1$ is the same as each other but $α_2$ is further smaller to be $1.7×10^{-5}$, and the coating film of Example 4 in which $α_2$ is smaller than $2.0×10^{-5}$ tends to more hardly peel off. It is considered that the influence of $α_2$ is minor from the viewpoint of the internal stress of coating film, but the influence of $α_2$ is acknowledged in the peeling resistance, and the coating film tends to more hardly peel off when $α_2$ is smaller even though no is the same. It can be seen that the peeling resistance is also slightly affected by $α_2$ although it is dominantly affected by $α_1$.

Incidentally, in Examples 5 to 7, when attention is paid to the kind of pigment compounded and the compounding amount thereof, the glass flakes are a scaly anisotropic material, thus the middle glass flakes have a larger aspect ratio as the average particle diameter thereof is larger than that of the small glass flakes. Furthermore, the spherical silica is an isotropic material and thus has the smallest aspect ratio. In order to set the linear expansion coefficients $α_1$ to be equal with one another using these pigments having different long side sizes, it is possible to set the linear expansion coefficient $α_1$ to be lower by compounding a smaller amount of pigment as the pigment has a larger aspect ratio.

When comparing Example 3, Example 8 and Example 9 with one another, it can be seen that the ease of peeling off is also equal when the linear expansion coefficients $α_1$ are equal with one another even though the respective formulation design systems are a strong solvent-based epoxy coating material, a weak solvent-based epoxy coating material and a pure epoxy coating material, and are different from one another. This result that the ease of peeling of is equal when the linear expansion coefficients $α_1$ are equal with one another even though the formulation design system of the coating material changes can also be said in the comparison between. Comparative Example 1 and Comparative Example 2.

EXAMPLES 10 AND 11

The formulation of the epoxy resin coating compositions of Examples 10 and 11 (Example-10 and Example-11) and Comparative Example 1 (Comparative-1) are presented in Table 3. For the formulation, the "thick film type modified epoxy resin coating material for steel structure, undercoat standard coating material" described in Reference Literature 3 as the standard mix proportions was designated as Comparative Example 1, and the resin and pigment contained therein were replaced with various target raw materials.

Production of each epoxy resin coating composition was conducted by the same method as in Examples 1 to 9, and each epoxy resin coating composition was produced by mixing the obtained main agent with the curing agent at the compounding ratio presented in Table 3.

TABLE 3

| | | | | Example-10 | Example-11 | Comparative-1 |
|---|---|---|---|---|---|---|
| Formulation | Amount of target pigment in non-volatile component (% by mass) | | | 56.0 | 55.4 | 31.8 |
| | Main agent | JER1001X75 | (Note 1) | | 28.0 | 29.7 |
| | | EPICLON 5900-60 | (Note 19) | 34.0 | | |
| | | NIKANOL, LLL | (Note 4) | | 2.0 | 5.0 |
| | | ADEKA GLYCIROL ED502 | (Note 20) | 2.0 | | |
| | | K-WHITE#82 | (Note 5) | 3.0 | 4.0 | 5.0 |
| | | CROWN TALC 3S | (Note 6) | 36.0 | 15.4 | 29.7 |
| | | Mica A-41S | (Note 21) | | 25.0 | |
| | | BENGALA 130R | (Note 12) | 9.4 | 9.0 | 9.9 |
| | | DISPARLON D4200-20X | (Note 13) | 1.0 | 1.0 | 1.0 |
| | | DISPARLON OX-66 | (Note 14) | 0.1 | 0.1 | 0.1 |
| | | KBM403 | (Note 15) | 0.5 | 0.5 | 1.0 |
| | | Xylene | | | 15.0 | 9.7 |
| | | Methyl isobutyl ketone | | | | 8.9 |
| | | Mineral spirits | | 14.0 | | |
| | Sum of main agent (parts by mass) | | | 100.0 | 100.0 | 100.0 |
| | Curing agent | SUNMIDE 150-65 | (Note 16) | | | 100.0 |
| | | TOHMIDE 225-X | (Note 22) | | 35.0 | |
| | | ADEKA HARDENER EH235R-2 | (Note 23) | 100.0 | | |
| | | Xylene | | | 65.0 | |
| | Sum of curing agent (parts by mass) | | | 100.0 | 100.0 | 100.0 |
| | Mixing ratio | Main agent | | 95.0 | 90.0 | 76.0 |
| | | Curing agent | | 5.0 | 10.0 | 24.0 |
| | Nonvolatile component in mixed coating material (% by mass) | | | 72.0 | 72.9 | 71.0 |

TABLE 3-continued

|  |  |  | Example-10 | Example-11 | Comparative-1 |
|---|---|---|---|---|---|
| Test results | Linear expansion coefficient ($\alpha_1$) × $10^{-5}$/K |  | 2.5 | 2.1 | 5.5 |
|  | Linear expansion coefficient ($\alpha_2$) × $10^{-5}$/K |  | 4.7 | 2.7 | 11.8 |
|  | Heat cycle peel test | 60 μm | 4 | 5-4 | 1 |
|  | (50 cycles) | 300 μm | 5-4 | 5 | 0 |
|  | CCT | General portion | Good | Good | Good |
|  |  | Cut portion | Very good | Very good | Good |
|  | Appearance |  | Good | Good | Good |
|  | Coating workability (brush coating) |  | Very good | Good | — |

(Note 19) EPICLON 5900-60: trade name, mineral spirits solution of alkylphenol novolac type epoxy resin manufactured by DIC Corporation, nonvolatile components: 60% by mass, epoxy equivalent: 640 to 700 g/eq (Note 20) ADEKA GLYCIROL ED502: trade name, alkyl glycidyl ether manufactured by ADEKA Corporation, nonvolatile components: 100% by mass, epoxy equivalent: 320 g/eq (Note 21) Mica A-41S: trade name, muscovite manufactured by YAMAGUCHI MICA CORPORATION, average particle diameter: 47 μm, aspect ratio: 80 (average)

(Note 22) TOHMIDE 225-X: trade name, polyaminoamide manufactured by T&K TOKA Corporation, amine value: 340

(Note 23) ADEKA HARDENER EH235R-2: trade name, ketimine-based curing agent manufactured by ADEKA Corporation, nonvolatile components: 100% by mass, amine value: 290 mg KOH/g The respective epoxy resin coating compositions obtained in Example 10, Example 11, and Comparative Example 1 were subjected to the following tests.

(1) Measurement of linear expansion coefficient ($\alpha_1$ and $\alpha_2$)

The linear expansion coefficients ($\alpha_1$ and $\alpha_2$) were measured and evaluated by the same method as in the respective epoxy resin coating compositions obtained in Examples 1 to 9 and Comparative Examples 1 to 8.

(2) Heat Cycle Peel Test

The linear expansion coefficients ($\alpha_1$ and $\alpha_2$) were measured and evaluated by the same method as in the respective epoxy resin coating compositions obtained in Examples 1 to 9 and Comparative Examples 1 to 8.

(3) Appearance of Coating Film

The appearance of coating film was evaluated by a method conforming to JIS K5551: 2008. Specifically, the coating composition was applied, then left to stand for 48 hours, and visually observed.

Good: crumbs, wrinkles, irregularities, cracks, blisters, holes, and peeling off are not acknowledged.

Poor: Any one or more of crumbs, wrinkles, irregularities, cracks, blisters, holes, and peeling off are acknowledged.

(4) Coating Workability (Brush Coating)

The workability when the coating composition was applied onto a tin plate (0.3 mm×75 mm×150 mm) having a clean surface one time using a brush so as to have a dried film thickness of 60 μm was evaluated, then the tin plate coated was leaned and held for 10 minutes, and the state of the coating film after 10 minutes was visually evaluated. The evaluation was conducted according to the following level in comparison with. Comparative Example 1.

Very good: Workability and finish are more favorable than those of Comparative Example 1

Good: Workability and finish are equal to those of Comparative Example 1

Poor: Workability or finish is poorer than that of Comparative Example 1

(5) Anticorrosion Property (CCT)

A test piece was prepared in conformity to JIS K5551: 2008 7.16 (cyclic corrosion). In this regard, however, the dried film thickness was set to 60 μm. Thereafter, cross-shaped cut notches reaching the base material were made to the prepared test piece in conformity to JIS K5600-7-9: 2006, 7.5 (method of making cut notches), and the test piece was subjected to the cyclic corrosion testing (120 cycles (720 hours) by cycle D) prescribed in JIS K5600-7-9 "cyclic corrosion testing method".

The general portion (portions other than the cut portion) and the cut portion after the test were visually evaluated according to the following criteria.

<General Portion>

Good: Generation of rust is not acknowledged.

Poor: Generation of rust is acknowledged.

<Cut Portion>

Very good: Width of coating film deformed from cut notch is less than 2.0 mm

Good: Width of coating film deformed from cut notch is 2.0 to 4.0 mm

Poor: Width of coating film deformed from cut notch exceeds 4.0 mm.

The present invention is required to exhibit not only peeling resistance but also excellent anticorrosion property, coating workability, appearance (decorative property) and the like in the case of being applied, for example, as an anticorrosive coating material exhibiting excellent peeling resistance, and thus a coating composition which exhibits excellent peeling resistance and is applicable to anticorrosive coating material applications was prepared by appropriately designing the formulation using various kinds of materials as presented in the present specification so as to satisfy the property values in the preferable range as presented in the present specification. Example 10 was presented as an example of a weak solvent-based coating material and Example 11 was presented as an example of a strong solvent-based coating material. It can be seen that peeling resistance can be improved without deteriorating all the anticorrosion property (CCT), appearance, and coating workability as compared with those of Comparative Example 1 which is positioned as an example of general formulation of anticorrosive coating materials.

The invention claimed is:

1. A coating composition comprising a resin component and a pigment, wherein a linear expansion coefficient at a temperature equal to or less than a glass transition temperature of a nonvolatile component is $3.2 \times 10^{-5}$/K or less and a linear expansion coefficient at a temperature equal to or more than the glass transition temperature of the nonvolatile component is $3.0\times10^{-5}$/K or less, wherein the resin component included in the coating composition is selected from the group consisting of an acrylic resin, a silicone resin, an acrylic silicone resin, a styrene acrylic copolymer resin, a polyester resin, a fluororesin, a rosin resin, a petroleum resin, a coumarone resin, a phenol resin, a urethane resin, a melamine resin, a urea resin, an epoxy resin, a cellulose resin, a xylene resin, an alkyd resin, an aliphatic hydrocarbon resin, a butyral resin, a maleic acid resin, a fumaric acid resin, a vinyl resin, an amine resin, a ketamine resin, and combinations thereof.

2. The coating composition according to claim 1, wherein the linear expansion coefficient at a temperature equal to or less than the glass transition temperature of the nonvolatile component is $2.5\times10^{-5}$/K or less.

3. The coating composition according to claim 2, wherein the linear expansion coefficient at a temperature equal to or less than the glass transition temperature of the nonvolatile component is $2.0\times10^{-5}$/K or less.

4. The coating composition according to claim 1, wherein the linear expansion coefficient at a temperature equal to or more than the glass transition temperature of the nonvolatile component is $2.0\times10^{-5}$/K or less.

5. The coating composition according to claim 1, wherein the coating composition is to be applied onto a structure.

6. The coating composition according to claim 1, wherein the coating composition is to be used for repair of a steel structure.

7. A coating film comprising a resin and a pigment, wherein a linear expansion coefficient at a temperature equal to or less than a glass transition temperature of the coating film is $3.2\times10^{-5}$/K or less and a linear expansion coefficient at a temperature equal to or more than the glass transition temperature of the coating film is $3.0\times10^{-5}$/K or less, wherein the resin component included in the coating composition is selected from the group consisting of an acrylic resin, a silicone resin, an acrylic silicone resin, a styrene acrylic copolymer resin, a polyester resin, a fluororesin, a rosin resin, a petroleum resin, a coumarone resin, a phenol resin, a urethane resin, a melamine resin, a urea resin, an epoxy resin, a cellulose resin, a xylene resin, an alkyd resin, an aliphatic hydrocarbon resin, a butyral resin, a maleic acid resin, a fumaric acid resin, a vinyl resin, an amine resin, a ketamine resin, and combinations thereof.

8. A coating method comprising coating an object to be coated with a coating composition comprising a resin component and a pigment to form a coating film having a linear expansion coefficient of $3.2\times10^{-5}$/K or less at a temperature equal to or less than a glass transition temperature of the coating film and a linear expansion coefficient of $3.0\times10^{-5}$/K or less at a temperature equal to or more than the glass transition temperature of the coating film, wherein the resin component included in the coating composition is selected from the group consisting of an acrylic resin, a silicone resin, an acrylic silicone resin, a styrene acrylic copolymer resin, a polyester resin, a fluororesin, a rosin resin, a petroleum resin, a coumarone resin, a phenol resin, a urethane resin, a melamine resin, a urea resin, an epoxy resin, a cellulose resin, a xylene resin, an alkyd resin, an aliphatic hydrocarbon resin, a butyral resin, a maleic acid resin, a fumaric acid resin, a vinyl resin, an amine resin, a ketamine resin, and combinations thereof.

9. The coating method according to claim 8, wherein the object to be coated is a steel structure.

10. The coating method according to claim 8, wherein the coating method is a coating method for repair and the coating is repeated every time repair is conducted.

\* \* \* \* \*